United States Patent
Lee et al.

(10) Patent No.: US 12,149,968 B2
(45) Date of Patent: Nov. 19, 2024

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Youngdae Lee, Seoul (KR); Seonwook Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 314 days.

(21) Appl. No.: 17/578,048

(22) Filed: Jan. 18, 2022

(65) Prior Publication Data

US 2022/0232403 A1    Jul. 21, 2022

(30) Foreign Application Priority Data

Jan. 18, 2021  (KR) .................. 10-2021-0006604

(51) Int. Cl.
*H04W 24/08* (2009.01)
*H04L 1/00* (2006.01)
(Continued)

(52) U.S. Cl.
CPC ........... *H04W 24/08* (2013.01); *H04L 1/0038* (2013.01); *H04W 4/06* (2013.01);
(Continued)

(58) Field of Classification Search
CPC ... H04L 1/0038; H04L 5/0007; H04L 5/0053; H04W 24/08; H04W 4/06; H04W 48/16;
(Continued)

(56) References Cited

U.S. PATENT DOCUMENTS 11,516,787 B2 *  11/2022  Takeda .................. H04W 72/04
11,570,642 B2 *   1/2023  Cirik .................... H04W 72/23
(Continued)

FOREIGN PATENT DOCUMENTS

EP       3562086       10/2019
KR    10-2019-0068422    6/2019
(Continued)

OTHER PUBLICATIONS

CATT, "Discussion on search space type definition for group scheduling," R1-2007838, Presented at 3GPP TSG RAN WG1 Meeting #103-e, e-Meeting, Oct. 26-Nov. 13, 2020, 3 pages.
(Continued)

*Primary Examiner* — Dung B Huynh
(74) *Attorney, Agent, or Firm* — Fish & Richardson P.C.

(57) ABSTRACT

According to an embodiment of the present disclosure, a user equipment (UE) may determine at least one monitoring search space (SS) set to be monitored by the UE in a specific slot having configured therein two or more SS sets based on a first threshold related to a physical downlink control channel (PDCCH) blind detection limit of the UE and a second threshold related to a control channel element (CCE) processing limit of the UE; and receive at least one PDCCH signal in the specific slot based on PDCCH candidates included in the determined at least one monitoring SS set.

14 Claims, 14 Drawing Sheets

(51) Int. Cl.
  *H04W 4/06*     (2009.01)
  *H04W 72/0446*  (2023.01)
  *H04W 72/23*    (2023.01)
  *H04W 72/56*    (2023.01)

(52) U.S. Cl.
  CPc ....... *H04W 72/0446* (2013.01); *H04W 72/23* (2023.01); *H04W 72/56* (2023.01)

(58) Field of Classification Search
  CPC .. H04W 72/0446; H04W 72/23; H04W 72/56
  See application file for complete search history.

(56) References Cited

U.S. PATENT DOCUMENTS

| | | | |
|---|---|---|---|
| 2012/0218969 A1* | 8/2012 | Tan | H04L 5/0051 370/329 |
| 2013/0039188 A1* | 2/2013 | Larsson | H04L 1/0039 370/329 |
| 2015/0146604 A1* | 5/2015 | Kim | H04L 1/0046 370/312 |
| 2015/0341918 A1 | 11/2015 | Yang et al. | |
| 2019/0150103 A1 | 5/2019 | Papasakellariou et al. | |
| 2019/0253308 A1* | 8/2019 | Huang | H04L 43/0823 |
| 2019/0335425 A1* | 10/2019 | Seo | H04L 5/0053 |
| 2020/0112484 A1* | 4/2020 | Sun | H04L 5/003 |
| 2020/0154413 A1* | 5/2020 | Hosseini | H04W 72/0446 |
| 2020/0314756 A1* | 10/2020 | Xu | H04L 5/0053 |
| 2020/0404669 A1* | 12/2020 | Seo | H04L 25/0238 |
| 2021/0067268 A1* | 3/2021 | Seo | H04L 25/0238 |
| 2021/0127285 A1* | 4/2021 | Khoshnevisan | H04L 5/001 |
| 2021/0195559 A1* | 6/2021 | Khoshnevisan | H04W 24/08 |
| 2021/0227569 A1* | 7/2021 | Xu | H04W 76/11 |
| 2021/0250917 A1* | 8/2021 | Takeda | H04W 72/23 |
| 2021/0250958 A1* | 8/2021 | Liu | H04L 5/0053 |
| 2021/0258928 A1* | 8/2021 | Khoshnevisan | H04L 5/0091 |
| 2021/0352501 A1* | 11/2021 | Taherzadeh Boroujeni | H04W 24/08 |
| 2021/0352633 A1* | 11/2021 | Tiirola | H04L 5/0094 |
| 2022/0046690 A1* | 2/2022 | Lee | H04W 4/08 |
| 2022/0053470 A1* | 2/2022 | Chen | H04W 76/28 |
| 2022/0053522 A1* | 2/2022 | MolavianJazi | H04W 72/1263 |
| 2022/0085931 A1* | 3/2022 | Mondal | H04W 72/044 |
| 2022/0116166 A1* | 4/2022 | Hui | H04L 27/2613 |
| 2022/0116981 A1* | 4/2022 | Saber | H04W 24/10 |
| 2022/0167194 A1* | 5/2022 | Gao | H04W 72/51 |
| 2022/0232403 A1* | 7/2022 | Lee | H04L 5/0053 |
| 2022/0240112 A1* | 7/2022 | Zhang | H04L 5/0053 |
| 2022/0240229 A1* | 7/2022 | Ji | H04L 5/0053 |
| 2022/0294578 A1* | 9/2022 | Kim | H04L 5/005 |
| 2022/0329399 A1* | 10/2022 | Kittichokechai | H04W 8/24 |
| 2022/0345920 A1* | 10/2022 | Liu | H04W 24/08 |
| 2023/0024010 A1* | 1/2023 | Ma | H04L 5/0053 |
| 2023/0026076 A1* | 1/2023 | Hu | H04W 72/1273 |
| 2023/0028180 A1* | 1/2023 | Lee | H04W 72/23 |
| 2023/0039536 A1* | 2/2023 | Liu | H04W 72/23 |
| 2023/0047726 A1* | 2/2023 | Xu | H04W 72/23 |
| 2023/0049505 A1* | 2/2023 | Takahashi | H04W 72/0446 |
| 2023/0049784 A1* | 2/2023 | Lee | H04W 72/1273 |
| 2023/0070761 A1* | 3/2023 | Kim | H04W 72/23 |
| 2023/0093727 A1* | 3/2023 | Lin | H04L 5/0053 370/312 |
| 2023/0156740 A1* | 5/2023 | Kim | H04L 5/0048 370/329 |
| 2023/0163879 A1* | 5/2023 | Li | H04W 72/23 |
| 2023/0180249 A1* | 6/2023 | Bala | H04W 52/028 370/329 |
| 2023/0199751 A1* | 6/2023 | Huang | H04W 52/0229 370/329 |
| 2023/0232481 A1* | 7/2023 | Park | H04L 5/003 370/329 |
| 2023/0262686 A1* | 8/2023 | Hua | H04L 5/001 370/329 |
| 2023/0269750 A1* | 8/2023 | Zhang | H04L 5/001 370/277 |
| 2023/0276451 A1* | 8/2023 | Zhang | H04L 5/0053 370/329 |
| 2023/0276458 A1* | 8/2023 | Lee | H04W 72/232 370/329 |
| 2023/0284283 A1* | 9/2023 | Xu | H04W 74/0833 370/329 |
| 2023/0292335 A1* | 9/2023 | Park | H04B 7/0404 |
| 2023/0299911 A1* | 9/2023 | Hui | H04L 27/2613 370/329 |
| 2023/0299918 A1* | 9/2023 | Song | H04L 5/0051 370/329 |
| 2023/0337253 A1* | 10/2023 | Zhou | H04B 7/06964 |
| 2023/0371046 A1* | 11/2023 | Babaei | H04W 72/121 |
| 2023/0413281 A1* | 12/2023 | Park | H04W 72/11 |
| 2023/0413296 A1* | 12/2023 | Zheng | H04L 5/0053 |
| 2024/0008009 A1* | 1/2024 | Ren | H04W 72/0446 |
| 2024/0015732 A1* | 1/2024 | Muruganathan | H04L 5/0023 |
| 2024/0030982 A1* | 1/2024 | Cirik | H04L 1/0027 |
| 2024/0080141 A1* | 3/2024 | Zhou | H04W 72/30 |

FOREIGN PATENT DOCUMENTS

| | | |
|---|---|---|
| WO | WO 2018/204886 | 11/2018 |
| WO | WO 2019/143164 | * 7/2019 |

OTHER PUBLICATIONS

CMCC, "FL summary on NR Multicast and Broadcast Services," R1-2007001, Presented at 3GPP TSG RAN WG1 #102-e, e-Meeting, Aug. 17-28, 2020, 17 pages.

International Search Report in International Appln. No. PCT/KR2022/000815, dated May 4, 2022, 21 pages (with English translation).

LG Electronics Inc., "MBS configuration for RRC_Connected," R2-2100989, Presented at 3GPP TSG-RAN WG2 Meeting #113 electronic Online, Jan. 25-Feb. 5, 2021, 3 pages.

CMCC, "Summary#1 on mechanisms to support group scheduling for RRC_Connected UEs for NR MBS," R1-2009629, Presented at 3GPP TSG RAN WG1 #103-e, e-Meeting, Oct. 26-Nov. 12, 2020, 103 pages.

Ericsson, "On Improvements to the Search Space Design," R1-1807250, Presented at 3GPP TSG-RAN WG1 Meeting #93, Busan, Korea, May 21-25, 2018, 8 pages.

Office Action issued in Korean Appln. No. 10-2022-7037180, dated Nov. 21, 2022, 17 pages (with English translation).

* cited by examiner

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application claims the benefit of Korean Application No. 10-2021-0006604, filed on Jan. 18, 2021, which is hereby incorporated by reference as if fully set forth herein.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, there is provided a method of receiving, by a user equipment (UE), a physical downlink control channel (PDCCH) including one or more control channel elements (CCEs) in a wireless communication system. The method may include: receiving configurations for a plurality of search space (SS) sets including one or more common search space (CSS) sets and one or more UE-specific search space (USS) sets; determining at least one monitoring SS set to be monitored by the UE in a specific slot configured with two or more of the plurality of SS sets, based on a first threshold related to a PDCCH blind detection limit of the UE and a second threshold related to a CCE processing limit of the UE; and receiving at least one PDCCH signal in the specific slot based on PDCCH candidates included in the determined at least one monitoring SS set.

Based on that the one or more CSS sets include a CSS set for a multicast broadcast service (MBS) and that the CSS set for the MBS is configured in the specific slot, the UE may be configured to: determine to monitor all remaining first CSS sets except for the CSS set for the MBS among first CSS sets configured in the specific slot; and select second SS sets to be additionally monitored by the UE from among the CSS set for the MBS and USS sets configured in the specific slot based on each SS set index until the UE reaches either the first threshold or the second threshold.

Among the CSS set for the MBS and the USS sets configured in the specific slot, SS sets not selected by the UE may be dropped from monitoring of the UE.

Among the CSS set for the MBS and the USS sets configured in the specific slot, an SS set with a lower SS set index may have a higher monitoring priority.

Each of the all remaining first CSS sets may have a higher monitoring priority than the CSS set for the MBS and the USS sets configured in the specific slot.

Based on that the UE reaches either the first threshold or the second threshold, the CSS set for the MBS may be dropped from PDCCH monitoring of the UE, but the all remaining first CSS sets may not be dropped.

Based on that an SS set index of the CSS set for the MBS is higher than an SS set index of a first USS and that the UE reaches either the first threshold or the second threshold, the UE may be configured to select the first USS and drop the CSS set for the MBS.

Each of the configurations for the plurality of SS sets may include a monitoring periodicity and an SS set index of each SS set.

The all remaining first CSS sets except for the CSS set for the MBS may be related to at least one of CSS Type0, CSS Type0A, CSS Type1, or CSS Type2 of 3rd generation partnership project (3GPP) based wireless communication.

Based on selection of the CSS set for the MBS, the UE may be configured to monitor a UE-group PDCCH in the CSS set for the MBS based on a group radio network temporary identifier (G-RNTI), and a scrambling sequence initialization parameter for the UE-group PDCCH may be configured by higher layer signaling or set as a cell identifier.

In another aspect of the present disclosure, there is provided a computer-readable storage medium having stored thereon a program for executing the above-described method.

In another aspect of the present disclosure, there is provided a UE configured to perform the method.

In another aspect of the present disclosure, there is provided a device configured to control the UE configured to perform the method.

In another aspect of the present disclosure, there is provided a method of transmitting, by a base station (BS), a PDCCH including one or more CCEs in a wireless communication system. The method may include: transmitting to a UE configurations for a plurality of SS sets including one or more CSS sets and one or more USS sets; determining at least one monitoring SS set to be monitored by the UE in a specific slot configured with two or more of the plurality of SS sets, based on a first threshold related to a PDCCH blind detection limit of the UE and a second threshold related to a CCE processing limit of the UE; and transmitting to the UE at least one PDCCH signal in the specific slot based on PDCCH candidates included in the determined at least one monitoring SS set.

Based on that the one or more CSS sets include a CSS set for an MBS and that the CSS set for the MBS is configured in the specific slot, the BS may be configured to: include all remaining first CSS sets except for the CSS set for the MBS among first CSS sets configured in the specific slot in the at least one monitoring SS set; and further include second SS sets selected based on each SS set index from among the CSS set for the MBS and USS sets configured in the specific slot in the at least one monitoring SS set until either the first threshold of the UE or the second threshold of the UE is reached.

In another aspect of the present disclosure, there is provided a BS configured to perform the method.

According to an embodiment of the present disclosure, a common search space (CSS) set for a multicast broadcast service (MBS) may be additionally configured, whereby a user equipment (UE) may clearly understand which search space (SS) set is available for transmission and reception of a physical downlink control channel (PDCCH), and more particularly, whether the PDCCH transmission and reception is allowed on PDCCH candidates on the SS set even if the UE reaches the limit of its processing capability.

It will be appreciated by persons skilled in the art that the effects that could be achieved with the present disclosure are not limited to what has been particularly described hereinabove and other advantages of the present disclosure will be more clearly understood from the following detailed description.

DETAILED DESCRIPTION

Figure 1:
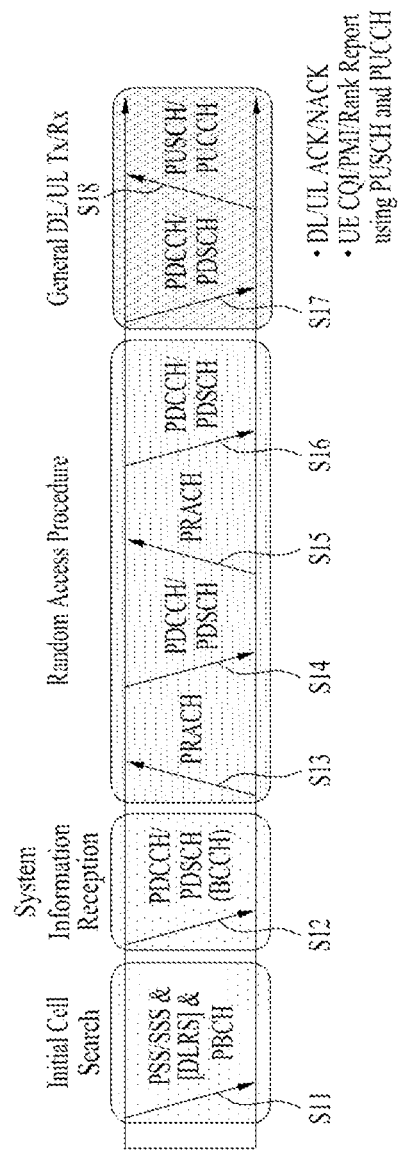
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/user equipments (UEs) sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in following documents.
3GPP LTE
   TS 36.211: Physical channels and modulation
   TS 36.212: Multiplexing and channel coding
   TS 36.213: Physical layer procedures
   TS 36.300: Overall description
   TS 36.321: Medium Access Control (MAC)
   TS 36.331: Radio Resource Control (RRC)
3GPP NR
   TS 38.211: Physical channels and modulation
   TS 38.212: Multiplexing and channel coding
   TS 38.213: Physical layer procedures for control
   TS 38.214: Physical layer procedures for data
   TS 38.300: NR and NG-RAN Overall Description
   TS 38.321: Medium Access Control (MAC)
   TS 38.331: Radio Resource Control (RRC) protocol specification
Abbreviations and Terms
   PDCCH: Physical Downlink Control CHannel
   PDSCH: Physical Downlink Shared CHannel
   PUSCH: Physical Uplink Shared CHannel
   CSI: Channel state information
   RRM: Radio resource management
   RLM: Radio link monitoring
   DCI: Downlink Control Information
   CAP: Channel Access Procedure
   Ucell: Unlicensed cell
   PCell: Primary Cell
   PSCell: Primary SCG Cell
   TBS: Transport Block Size
   SLIV: Starting and Length Indicator Value
   BWP: BandWidth Part
   CORESET: COntrol REsourse SET
   REG: Resource element group
   SFI: Slot Format Indicator COT: Channel occupancy time SPS: Semi-persistent scheduling PLMN ID: Public Land Mobile Network identifier RACH: Random Access Channel RAR: Random Access Response MBMS: Multimedia Broadcast/Multicast Service Msg3: Message transmitted on UL-SCH containing a C-RNTI MAC CE or CCCH SDU, submitted from upper layer and associated with the UE Contention Resolution Identity, as part of a Random Access procedure.

Special Cell: For Dual Connectivity operation the term Special Cell refers to the PCell of the MCG or the PSCell of the SCG depending on if the MAC entity is associated with the MCG or the SCG, respectively. Otherwise the term Special Cell refers to the PCell. A Special Cell supports PUCCH transmission and contention-based Random Access, and is always activated.

Serving Cell: A PCell, a PSCell, or an SCell

MBSFN Synchronization Area: (In the case of an LTE network), the term MBSFN Synchronization Area refers to a network area where all base stations are capable of being synchronized and performing MBSFN transmission. The MBSFN synchronization area may support one or more MBSFN areas. On a given frequency, an eNodeB may only belong to one MBSFN synchronization area. MBSFN synchronization areas are defined independently of MBMS service areas.

MBSFN Transmission or a transmission in MBSFN mode: The term MBSFN Transmission refers to a simultaneous broadcast technique in which multiple cells transmit the same waveform at the same time. An MBSFN transmission from multiple cells within an MBSFN area is considered a single transmission by a UE.

MBSFN Area: The MBSFN area consists of a group of cells within an MBSFN synchronization area, which cooperate for MBSFN. Except for reserved cells in the MBSFN area, all cells participate in the MBSFN Transmission and advertise their MBMSN availability. The UE only needs to consider a subset of configured MBSFN areas (i.e., services of interest).

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
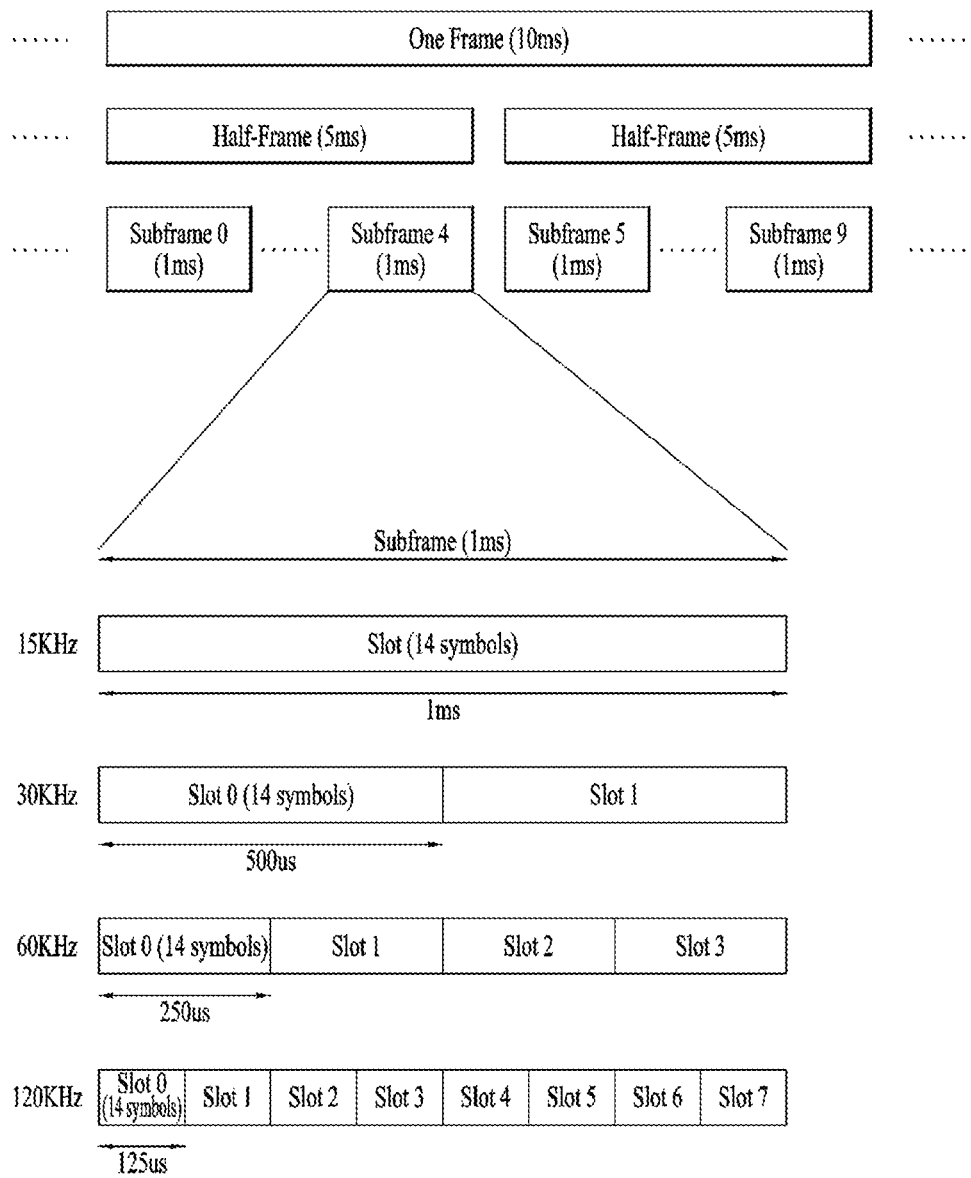
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot $N^{frame,u}_{slot}$: Number of slots in a frame $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
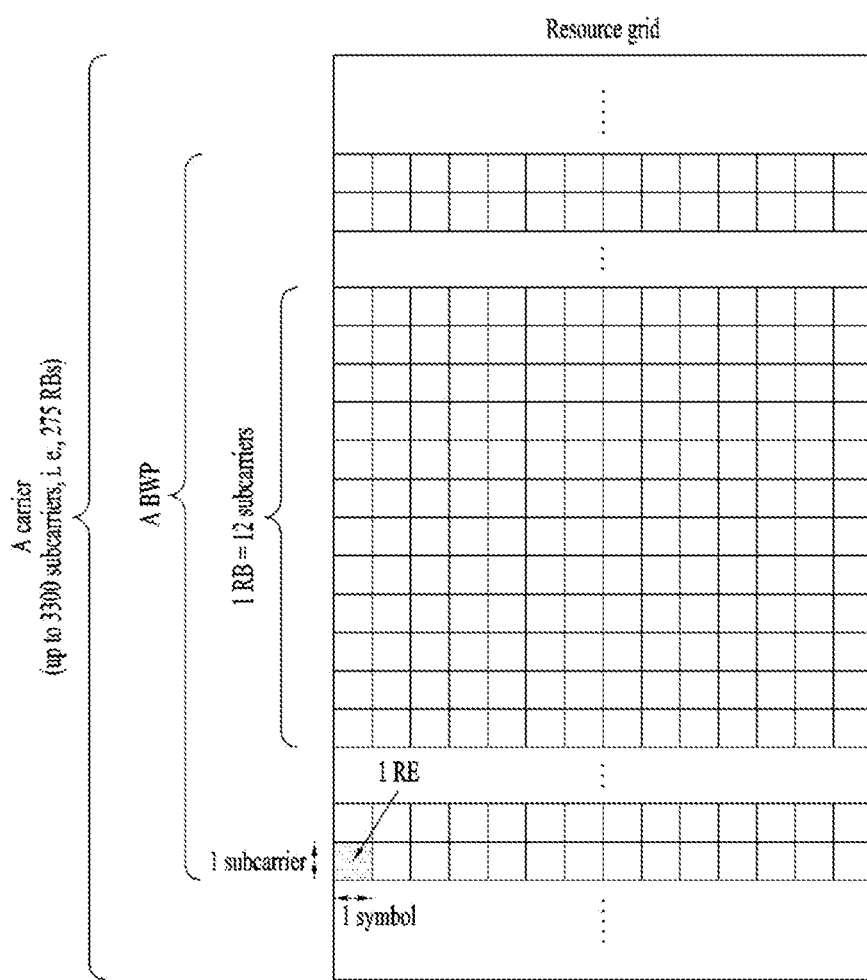
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
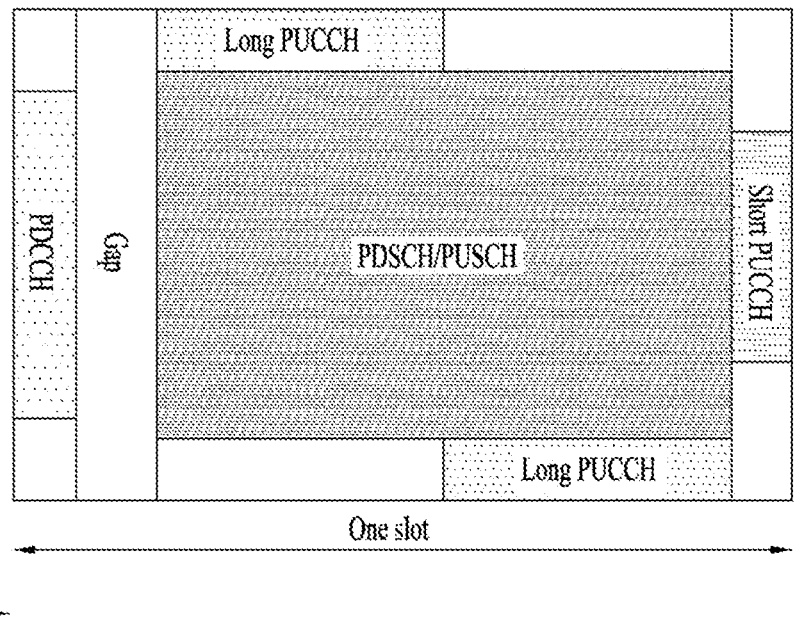
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

A BS may transmit a control resource set (CORESET) configuration to a UE. A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization.

When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE. The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. For example, the CORE-SET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

- searchSpaceId: indicates the ID of an SS.
- controlResourceSetId: indicates a CORESET associated with the SS.
- monitoringSlotPeriodicityAndOffset: indicates a periodicity (in slots) and offset (in slots) for PDCCH monitoring.
- monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
- nrofCandidates: indicates the number of PDCCH candidates (one of values 0, 1, 2, 3, 4, 5, 6, and 8) for each AL where AL={1, 2, 4, 8, 16}.
- searchSpaceType: indicates common search space (CSS) or UE-specific search space (USS) as well as a DCI format used in the corresponding SS type.

Subsequently, the BS may generate a PDCCH and transmit the PDCCH to the UE, and the UE may monitor PDCCH candidates in one or more SSs to receive/detect the PDCCH. An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |

TABLE 3-continued

| Type | Search Space | RNTI | Use Case |
|---|---|---|---|
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, is whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

PDSCH carries downlink data (e.g., DL-SCH transport block, DL-SCH TB). The modulation scheme such as Quadrature Phase Shift Keying (QPSK), 16 Quadrature Amplitude Modulation (QAM), 64 QAM, or 256 QAM is applied to the PDSCH. A codeword is generated by encoding the TB. The PDSCH can carry up to two codewords. Scrambling and modulation mapping are performed for each codeword, and modulation symbols generated from each codeword may be mapped to one or more layers. Each layer is mapped to resources along with a demodulation reference signal (DMRS), is generated as an OFDM symbol signal, and is transmitted through a corresponding antenna port.

PUCCH carries Uplink Control Information (UCI). UCI may include one or more of following information:

SR (Scheduling Request): Information used to request a UL-SCH resource.

HARQ (Hybrid Automatic Repeat reQuest)-ACK (Acknowledgment): It is a response to a downlink data packet (e.g., codeword) on the PDSCH, and indicates whether the downlink data packet has been successfully received. 1 bit of HARQ-ACK may be transmitted in response to a single codeword, and 2 bits of HARQ-ACK may be transmitted in response to two codewords. The HARQ-ACK response includes positive ACK (simply, ACK), negative ACK (NACK), DTX or NACK/DTX. Here, HARQ-ACK may be called as HARQ ACK/NACK and ACK/NACK.

CSI (Channel State Information): feedback information for a downlink channel. Multiple Input Multiple Output (MIMO)-related feedback information includes a Rank Indicator (RI) and a Precoding Matrix Indicator (PMI).

Table 5 shows PUCCH formats. According to PUCCH length, PUCCH formats can be classified as Short PUCCH (format 0, 2) and Long PUCCH (format 1, 3, 4).

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a maximum size of 2 bits, and is mapped and transmitted based on a sequence. Specifically, the UE transmits a specific UCI to the base station by transmitting one of the plurality of sequences through the PUCCH having the PUCCH format 0. The UE transmits a PUCCH format 0 within a PUCCH resource for configuring a corresponding SR only when transmitting a positive SR.

PUCCH format 1 carries UCI with a maximum size of 2 bits, and a modulation symbol is spread by an orthogonal cover code (OCC) (configured differently depending on whether frequency hopping is performed) in the time domain. DMRS is transmitted in a symbol in which a modulation symbol is not transmitted (i.e., time division multiplexing (TDM) is performed).

PUCCH format 2 carries UCI having a bit size greater than 2 bits, and a modulation symbol is transmitted with DMRS based on frequency division multiplexing (FDM). DM-RS is located at symbol indexes #1, #4, #7, and #10 in a given resource block with a density of 1/3. A Pseudo Noise (PN) sequence is used for the DM_RS sequence. For 2-symbol PUCCH format 2, frequency hopping may be enabled.

For PUCCH format 3, UE multiplexing is not performed in the same physical resource blocks, and the PUCCH format 3 carries UCI having a bit size greater than 2 bits. PUCCH resource of PUCCH format 3 does not include an orthogonal cover code. The modulation symbol is transmitted with the DMRS based on time division multiplexing (TDM).

For PUCCH format 4, UE multiplexing is supported for up to 4 UEs in the same physical resource blocks, and the PUCCH format 4 carries UCI having a bit size greater than 2 bits. PUCCH resource of PUCCH format 3 includes an orthogonal cover code. The modulation symbol is transmitted with DMRS based on time division multiplexing (TDM).

The following documents may be referred to as 3GPP Technical Specifications related to PUCCH (incorporated by reference).

UCI generation [TS 38.212] subclause 6.3
PUCCH format [TS 38.211] subclause 6.3.2
PUCCH baseband sequence generation [TS 38.211] subclause 5.2.2.2
PUCCH resource set [TS 38.213] subclause 9.2.1
PUCCH RRC [TS 38.331] subclause 6.3.2
UCI encoding (UCI>=12) [TS 38.212] subclause 6.3.1.2.1
UCI encoding (UCI<=11) [TS 38.212] subclause 6.3.1.2.2
PUCCH repetition [TS 38.213] subclause 9.2.6

PUSCH carries uplink data (e.g., UL-SCH transport block, UL-SCH TB) and/or uplink control information (UCI). PUCCH is transmitted based on a CP-OFDM (Cyclic Prefix—Orthogonal Frequency Division Multiplexing) waveform or a Discrete Fourier Transform-spread-Orthogonal Frequency Division Multiplexing (DFT-s-OFDM) waveform. When the PUSCH is transmitted based on the DFT-s-OFDM waveform, the UE performs transform precoding for the PUSCH. For example, if transform precoding is not performed (e.g., transform precoding is disabled), the UE transmits a PUSCH based on the CP-OFDM waveform. If transform precoding is performed (e.g., transform precoding is enabled), the UE transmits the PUSCH based on a CP-OFDM waveform or a DFT-s-OFDM waveform. PUSCH transmission is dynamically scheduled by a UL grant in DCI (e.g., Layer 1 (PDCCH) signaling), and/or semi-statically scheduled based on higher layer (e.g., RRC) signaling (configured grant). PUSCH transmission may be performed on a codebook-based or non-codebook-based basis.

Figure 5:
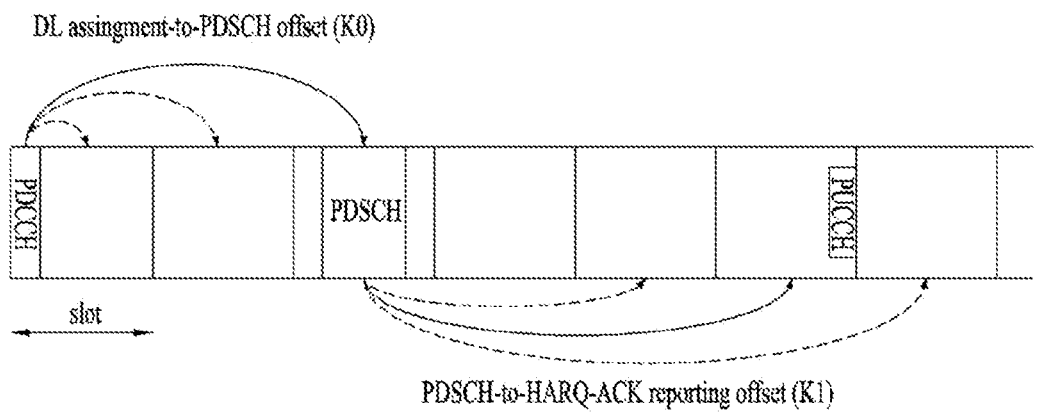
FIG. 5 illustrates an example of a physical downlink shared channel (PDSCH) transmission/reception procedure.

FIG. 5 illustrates an example of a PDSCH transmission/reception procedure. Referring to FIG. 5, the UE may detect the PDCCH in slot #n. Here, the PDCCH includes downlink scheduling information (e.g., DCI formats 1_0, 1_1), and the PDCCH indicates a DL assignment-to-PDSCH offset (K0) and a PDSCH-HARQ-ACK reporting offset (K1). For example, DCI formats 1_0 and 1_1 may include the following information:

Frequency domain resource assignment (FDRA): FDRA indicates the RB set allocated to the PDSCH.

Time domain resource assignment (TDRA): TDRA indicates K0 (e.g., slot offset), the starting position (e.g., OFDM symbol index) of the PDSCH within slot #n+K0, and the length of the PDSCH (e.g., the number of OFDM symbols).

PDSCH-to-HARQ feedback timing indicator, which indicates K1 (e.g., slot offset)

HARQ process number (4 bits), which indicates the HARQ process ID (Identity) for data (e.g., PDSCH, TB)

PUCCH resource indicator (PM): PRI indicates a PUCCH resource to be used for UCI transmission among a plurality of PUCCH resources in the PUCCH resource set The UE receives the PDSCH in slot #(n+K0) based on the scheduling information received in slot #n. After completion of the PDSCH reception in slot #n1 (where, n+K0≤n1), the UE may transmit UCI through PUCCH from slot #(n1+K1). Here, the UCI may include a HARQ-ACK response for the PDSCH. In FIG. 5, for convenience, it is assumed that the SCS for the PDSCH and the SCS for the PUCCH are the same, and it is assumed that slot # n1 =slot # n +K0, but the present disclosure is not limited thereto. If the SCSs are different, K1 may be indicated/interpreted based on the SCS of the PUCCH.

If the PDSCH is configured to carry a maximum of 1 TB, the HARQ-ACK response may have 1-bit. When the PDSCH is configured to carry a maximum of 2 TBs, the HARQ-ACK response may be configured with 2-bits when spatial bundling is not configured, and may be configured with 1-bits when spatial bundling is configured. When the HARQ-ACK transmission time for the plurality of PDSCHs is configured as slot #(n+K1), the UCI transmitted in the slot #(n+K1) includes HARQ-ACK responses for the plurality of PDSCHs.

Whether the UE should perform spatial bundling for the HARQ-ACK response may be configured for each cell group (e.g., RRC/higher layer signaling). As an example, spatial bundling may be individually configured in each of the HARQ-ACK response transmitted through the PUCCH and/or the HARQ-ACK response transmitted through the PUSCH.

Spatial bundling may be supported when the maximum number of TBs (or codewords) that can be received at one time in the corresponding serving cell (or schedulable through 1 DCI) is two (or two or more) (e.g., higher layer parameter maxNrofCodeWordsScheduledByDCI is equal to 2-TB). Meanwhile, a number of layers greater than four may be used for 2-TB transmission, and a maximum of four layers may be used for 1-TB transmission. As a result, when spatial bundling is configured in a corresponding cell group, spatial bundling may be performed on a serving cell that can schedule more than four layers among serving cells in the corresponding cell group. On a corresponding serving cell, a UE desiring to transmit a HARQ-ACK response through spatial bundling may generate a HARQ-ACK response by performing (bit-wise) logical AND operation on ACK/NACK (A/N) bits for a plurality of TBs.

For example, assuming that the UE receives DCI for scheduling 2-TB and receives 2-TB through the PDSCH based on the DCI. If spatial bundling is performed, a single A/N bit may be generated by performing a logical AND operation on the first A/N bit for the first TB and the second A/N bit for the second TB. As a result, if both the first TB and the second TB are ACKs, the UE reports the ACK bit value to the BS, and when either TB is NACK, the UE reports the NACK bit value to the BS.

For example, when only a 1-TB is actually scheduled on a serving cell in which 2-TB reception is allowed, the UE may generate a single A/N bit by performing a logical AND operation on the A/N bit for the corresponding 1-TB and a bit value of 1. As a result, the UE may report the A/N bit for the corresponding 1-TB to the BS as it is.

A plurality of parallel DL HARQ processes can be configured for DL transmission in the base station/terminal. A plurality of parallel HARQ processes allow DL transmissions to be performed continuously while waiting for HARQ feedback on successful or unsuccessful reception of the previous DL transmission. Each HARQ process is associated with a HARQ buffer of a MAC (Medium Access Control) layer. Each DL HARQ process manages information related to the number of MAC PDU (Physical Data Block) transmissions in the buffer, HARQ feedback for the MAC PDU in the buffer, and a current redundancy version. Each HARQ process is identified by a HARQ process ID.

Figure 6:
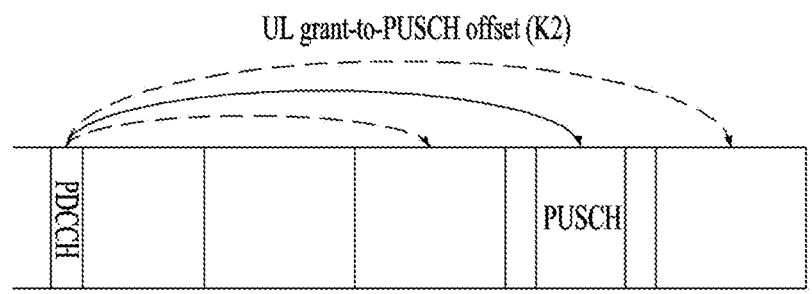
FIG. 6 illustrates an example of a physical uplink shared channel (PUSCH) transmission/reception procedure.

FIG. 6 illustrates an example of a PUSCH transmission/reception procedure. Referring to FIG. 6, the UE may detect the PDCCH in slot #n. Here, the PDCCH includes uplink scheduling information (e.g., DCI formats 0_0, 0_1). DCI formats 0_0 and 0_1 may include the following information:
Frequency domain resource assignment (FDRA), which indicates the RB set allocated to the PUSCH
Time domain resource assignment (TDRA), which indicates the slot offset K2, the start position (e.g., symbol index) and length (e.g., number of OFDM symbols) of the PUSCH in the slot. The start symbol and length may be indicated through a Start and Length Indicator Value (SLIV), or may be indicated respectively.

The UE may transmit the PUSCH in slot #(n+K2) according to the scheduling information received in slot #n. The PUSCH may include a UL-SCH TB.

Figure 7:
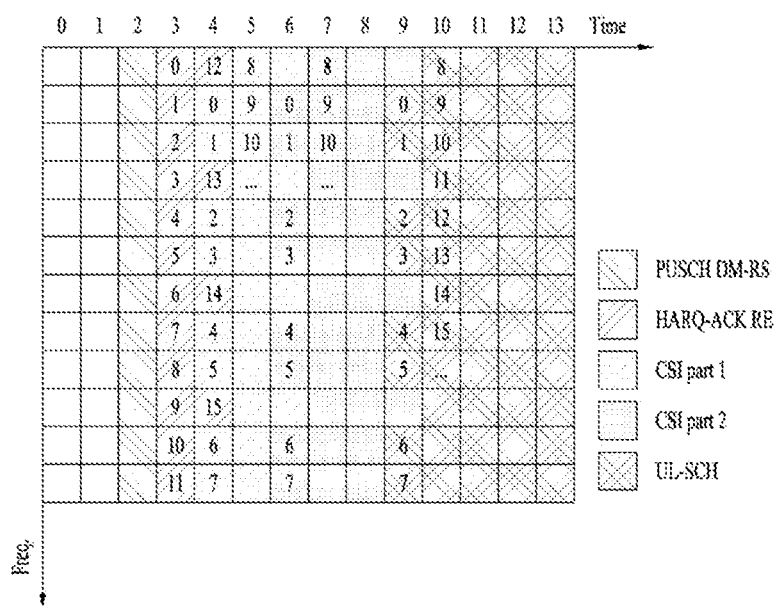
FIG. 7 illustrates an example of multiplexing uplink control information (UCI) with a PUSCH.

FIG. 7 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

Multimedia Broadcast/Multicast Service (MBMS)

Hereinafter, MBMS schemes used in 3GPP LTE will be described. 3GPP MBMS may be classified as (i) a single frequency network (SFN) scheme in which a plurality of BS cells are synchronized to transmit the same date on a PMCH, and (ii) a single cell point to multipoint (SC-PTM) scheme in which broadcasting is performed over a PDCCH/PDSCH in the coverage of a corresponding cell. The SFN scheme is used to provide broadcast services over a wide area (e.g., MBMS area) on semi-statically pre-allocated resource(s), whereas the SC-PTM scheme is used to provide broadcast services within a cell coverage on dynamic resource(s).

SC-PTM provides one logical channel, i.e., a single cell multicast control channel (SC-MCCH) and one or more logical channels, i.e., one or more single cell multicast traffic channels (SC-MTCHs). The logical channels are mapped to a transport channel, a DL-SCH, and a physical channel, a PDSCH. The PDSCH carrying SC-MCCH data or SC-MTCH data is scheduled by a PDCCH scrambled with a group RNTI (G-RNTI). In this case, a temporary mobile group identity (TMGI) corresponding to a service ID may be one-to-one mapped to a specific G-RNTI value. Thus, if the BS provides a plurality of services, a plurality of G-RNTI values may be allocated for SC-PTM transmission. One or more UEs may perform PDCCH monitoring based on a specific G-RNTI to receive a specific service. For the specific service/G-RNTI, an SC-PTM dedicated DRX on-duration may be configured. In this case, the UEs may wake up for specific on-duration(s) and perform the PDCCH monitoring based on the G-RNTI.

PDCCH Monitoring for Multicast/Broadcast Service (MBS)

The above descriptions (3GPP system, frame structure, NR system, etc.) may be applied in combination with the methods proposed in the present disclosure, which will be described later, or used as supplements to clarify the technical features of the methods proposed in the present disclosure. In this document, '/' may mean 'and', 'or', or 'and/or' depending on the context.

In NR, the UE supports DL reception based on beamforming. The UE receives a DL signal on a specific beam among a plurality of candidate beams. In particular, when the UE is in connected mode, the BS and UE may maintain an optimal beam for the UE through a beam management (BM) process. Accordingly, the BS may transmit a PDCCH/PDSCH on an optimal TX beam suitable for the UE, and the UE may receive the PDCCH/PDSCH on an optimal RX beam.

REL-17 NR intends to introduce a DL broadcast or DL multicast transmission method to support multicast/broadcast service (MBS) services. In a point-to-multipoint (PTM) transmission method such as MBS, one DL broadcast/multicast transmission is received by multiple UEs, and thus the PTM transmission method has an advantage of saving radio resources, compared to when a DL unicast transmission is transmitted to each UE (e.g., point-to-point transmission). In this case, if the UE receives a PTM based PDCCH/PDSCH in DL, the UE may also receive other DL channels as well as the PTM based PDCCH/PDSCH. Therefore, there is need for a method of configuring an SS and a CORESET efficiently and a method of transmitting and receiving a PDSCH based on DCI for UEs receiving MBSs and unicast PDCCHs/PDSCHs together.

An MBS BWP may be referred to as a "common frequency resource (CFR)", and the CFR may be configured only for DL as described above. In this case, a HARQ-ACK (or NACK only) may be transmitted in a (unicast) active UL BWP. HARQ feedback may correspond to an A/N report or a NACK only report depending on higher layer configurations. For example, when the NACK only scheme is configured, the UE may transmit HARQ feedback if the UE fails to receive a related MBS. On the contrary, the UE may drop ACK transmission if the UE correctly receives the MBS. When the A/N reporting scheme is configured, the UE may report a HARQ-ACK response in both cases of an ACK and a NACK. A CFR for the MBS may provide the same MBS to one or more UEs. For example, when CFR_A is associated with BWP 1 of UE 1 (for example, CFR_A is configured in BWP 1) and CFR_B is associated with BWP 2 of UE 1 (for example, CFR_B is configured in BWP 2), CFR_A may be additionally configured for BWP 2 of UE 2 and BWP 3 of UE 3, and CFR_B may be additionally configured for BWP 3 of UE 2 and BWP 4 of UE 4. Accordingly, CFR_A may be a CFR for UEs 1, 2, and 3, and CFR_B may be a CFR for UEs 1, 2, and 4. For example, it is assumed that the current active BWP of UE 1 is BWP 1 and UE 1 is receiving an MBS on CFR_A associated with BWP 1 of UE 1. In this case, if UE 1 is instructed by DCI to switch to BWP 2, UE 1 may activate BWP 2 (which is inactive) and start MBS reception on CFR_B associated with the new active BWP. When BWP switching is completed, UE 1 may deactivate BWP 1 and no longer receive CFR_A.

The BS may provide an MBS related search space set (hereinafter referred to as an MSS). The MSS may be defined as a new type of CSS, a USS, or a new SS that is neither a CSS nor a USS. Herein, an SS set may be simply referred to as an SS. For example, a USS set may be referred to as a USS, and a CSS set may be referred to as a CSS.

One MSS set, which is configured by the BS, may be configured/defined as follows:
- At least one MBS channel may be associated with one MSS set. For example, at least one MCCH or MTCH may be associated with one MSS set.
- An MBS control information message or MBS SIB may be associated with one MSS set.
- At least one MBS service may be associated with one MSS set. For example, at least one MBS service ID (e.g., TMGI) may be associated with one MSS set.
- At least one RNTI value may be associated with one MSS set. For example, at least one G-RNTI may be associated with one MSS set. Alternatively, at least one SC-RNTI may be associated with one MSS set.

When the BS performs multicast/broadcast transmission based on beamforming, the BS may configure one G-RNTI, one MBS service, or one MCCH/MTCH to be associated with a plurality of CORSETs/MSS sets. For example, the BS may associate one SSB or one CSI-RS resource set with one CORSET/MSS set. In addition, CORSETs/MSS sets less than or equal to the total number of SSBs or CSI-RS resource sets provided by the BS may be associated with one G-RNTI, one MBS service, or one MCCH/MTCH.

Alternatively, the BS may associate one SSB or one CSI-RS resource set with a plurality of CORSETs/MSS sets. Alternatively, the BS may associate a plurality of SSBs or a plurality of CSI-RS resource sets to one CORSET/MSS set.

To broadcast MBS services on a cell, the BS managing the corresponding cell may transmit SIB1, an MBS SIB, at least one MCCH, and/or at least one MTCH. The MCCH and MTCH, each corresponding to a logical channel, may be transmitted on a PDSCH, which is a physical channel, and scheduled by a PDCCH. The MCCH may carry MBS control information, and the MTCH may carry MBS data.

The BS may provide UEs with a BWP for the MBS (e.g., an MBS BWP). The MBS BWP may include at least one of an MBS SIB DL/UL BWP for MBS SIB transmission/reception, an MCCH DL/UL BWP for MCCH transmission/reception, or an MTCH DL/UL BWP for MTCH transmission/reception. One cell may provide zero or one or more MBS DL BWPs and/or zero or one or more MBS UL BWPs. Therefore, if the BS supports the MBS, the BS may provide all MBS BWP types (independently of conventional initial BWPs or UE-dedicated BWPs). Alternatively, the BS may provide zero or some MBS BWPs. Some or all of the MBS BWPs may be the same as or different from the conventional initial BWP, default BWP, first active BWP, or active BWP.

For example, the BS may transmit the MBS SIB and SIB1 in an initial DL BWP and transmit the PDCCH/PDSCH for the MCCH and MTCH in the initial DL BWP or a separate DL BWP (hereinafter such a DL BWP is referred to as an MBS DL BWP). Alternatively, the BS may transmit the MBS SIB in an MBS SIB DL BWP. In addition, the BS may separately configure an MBS SIB UL BWP to allow the UE to request the MBS SIB on demand.

The MBS SIB may include configuration information on an MCCH DL/UL BWP for at least one MCCH and configuration information on a PDCCH MSS set for MCCH transmission. In addition, the MBS SIB or MBS control information may include configuration information on an MTCH DL/UL BWP for at least one MTCH and configuration information on a PDCCH MSS set for MTCH transmission.

Configuration information on an MBS BWP may include information on the frequency location, bandwidth size, and SCS of the corresponding BWP. The MBS BWP may be included in the same cell as the initial BWP or may be included in a different cell (hereinafter referred to as an MBS SCell). When the UE desires to receive MBS services, the UE may receive a PDCCH/PDSCH for transmitting MCCH/MTCH data by configuring the MBS BWP and MBS Scell, regardless of the RRC state of the UE. Meanwhile, the BS may transmit MBS control information to a UE in the connected state (hereinafter referred to as a connected UE) through UE-dedicated signaling.

When the BS provides the MBS, the BS may transmit (e.g., broadcast) at least part of the following information in the corresponding cell.

1) Information Included in SIB1

It may be indicated whether the MBS SIB is currently broadcast.

The UE may be instructed to use a Type0A-PDCCH CSS set to receive the MBS SIB. Alternatively, the UE may be provided with the configurations of a new CORSET and a PDCCH CSS set type for receiving the MBS SIB.

i. The BS may provide a plurality of CORSETs/CSS sets for a plurality of beams/TRPs/TCI states to the UE in the CSS configuration information. The UE may select a (best) SSB index based on the measurements of SS/PBCH blocks of the serving cell, select a TCI state for the selected (best) SSB index, and monitor a CORSET/CSS associated with the selected TCI state.

ii. The UE may monitor a PDCCH in the CSS associated with the selected TCI state and receive DCI having a CRC scrambled with an SI-RNTI. The UE may obtain the MBS SIB from a PDSCH indicated by the corresponding DCI.

If the MBS SIB and MCCH/MTCH is capable of being transmitted in a DL BWP different from an initial DL BWP, the configuration of the MBS DL BWP may be provided.

An SC-RNTI value for at least one MCCH may be provided. A different SC-RNTI may be provided for each MCCH.

Whether the MBS SIB is currently broadcast may be provided. If the MBS SIB is not being broadcast, information on a RACH preamble and/or RACH resource for requesting the MBS SIB in an on-demand manner may be provided.

i. The BS may indicate that RACH transmission for the on-demand request needs to be performed in an initial UL BWP. Alternatively, the BS may indicate that the RACH transmission for the on-demand request needs be performed in an MBS UL BWP different from the initial UL BWP, and UL BWP configuration information thereon may be provided through SIB1.

ii. Upon receiving SIB1, the UE may determine whether the MBS SIB is currently broadcast. For example, if the MBS SIB is not broadcast and if SIB1 includes information on a RACH preamble and/or RACH resource, the UE may perform RACH transmission based on the RACH preamble and/or RACH resource indicated by the corresponding information. In this case, if the UE is instructed to use the initial UL BWP, the UE may perform the RACH transmission in the initial UL BWP. On the other hand, if there is configuration information on a UL BWP for the MBS, the UE may configure and activate the corresponding UL BWP to perform the RACH transmission. In this case, the UE may deactivate the initial UL BWP or operate the two UL BWPs simultaneously in time. Alternatively, the UE may switch between the two UL BWPs based on time division multiplexing (TDM) and operate on different time resources.

2) Information Included in MBS SIB

Configuration information on MBS DL BWP i. Information on the frequency location, bandwidth size, and SCS of a DL BWP in which a PDCCH/PDSCH for the MCCH/MTCH is transmitted may be included.

ii. If the UE desires to receive the MBS, the UE may receive configuration information on an MBS DL BWP and activate the MBS DL BWP. In this case, the UE may deactivate an initial DL BWP, perform reception in the initial DL BWP and the MBS DL BWP at the same time, or perform reception in the initial DL BWP and the MBS DL BWP at different times. Here, the MBS DL BWP for MCCH data transmission/reception is an MCCH DL BWP, which may be the same as or different from an MTCH DL BWP for MTCH data transmission/reception.

Configuration information on PDCCH MSS set for MCCH data transmission i. The MCCH carries MBS control information. The UE may receive DCI scheduling the MBS control information on the MCCH in a new type of PDCCH MSS set. To this end, the UE may receive configuration information on a PDCCH CSS set through the MBS SIB and receive the DCI scheduling the MCCH data by monitoring the corresponding PDCCH CSS set. In this case, the CRC of the DCI may be scrambled with an SC-RNTI.

ii. To transmit the MBS control information on the MCCH, the BS may provide a plurality of CORSETs/MSS sets for a plurality of beams/TRPs/TCI states to the UE. To receive the MBS control information on the MCCH, the UE may select the best SSB index based on the measurements of SS/PBCH blocks of the serving cell, select a TCI state for the selected SSB index, and monitor a CORSET/MSS associated with the selected TCI state.

iii. The UE may monitor a PDCCH in the MSS associated with the selected TCI state and receive the DCI of which the CRC is scrambled with the SC-RNTI. The UE may receive a PDSCH indicated by the corresponding DCI to receive the MBS control information on the MCCH.

iv. The MSS for the MBS control information transmission on the MCCH may be replaced with a CSS or USS.

3) Information Included in MBS Control Information on MCCH

Configuration information on at least one DL BWP may be provided.

i. The DL BWP may be one of an initial DL BWP, an MBS DL BWP, or an active BWP of the UE. The MBS DL BWP for MTCH data transmission/reception may be an MTCH DL BWP, which may be the same as or different from an MCCH DL BWP for MCCH data transmission/reception.

MBS service ID list for each DL BWP (e.g., TMGI list)

i. The BS may indicate to the UE an MBS service ID transmitted in a specific DL BWP. The MBS service ID may be associated with a specific MTCH, and corresponding MBS data may be transmitted over a PDSCH.

ii. The UE may activate a DL BWP in which an MBS service that the UE desires to receive is transmitted and receive MBS data in the corresponding DL BWP.

A G-RNTI associated with the MBS service ID may be provided.

It may indicate whether HARQ feedback transmission for PDSCH transmission is activated for each MBS service ID.

Configuration information on a PUCCH resource for HARQ feedback transmission or MBS related CSI transmission may be provided for each MBS service ID.

Configuration information on an MBS UL BWP for HARQ feedback transmission or MBS related CSI transmission may be provided for each MBS service ID.

i. When the UE desires to receive specific MBS data, if HARQ feedback transmission for the corresponding MBS service is activated, the UE may activate an MBS UL BWP associated with the corresponding MBS service and transmit HARQ feedback in the MBS UL BWP.

Configuration information on an SS set associated with to the MBS service ID may be provided.

i. The BS may associate at least one MBS service ID with a specific MSS set. The MSS may be defined as a new type of CSS, a USS, or a new SS that is neither a CSS nor a USS.

ii. The UE may activate a DL BWP in which an MBS service that the UE desires to receive is transmitted and monitor a PDCCH in a specific MSS set associated with the MBS service.

iii. For the specific MSS set for transmission of specific MBS data, the BS may provide a plurality of CORSETs/MSS sets for a plurality of beams/TRPs/TCI states to the UE. To receive the specific MBS data, the UE may select the best SSB index based on the measurements of SS/PBCH blocks of the serving cell, select a TCI state for the selected SSB index, and monitor a CORSET/MSS associated with the selected TCI state.

iv. The UE may monitor a PDCCH in the MSS associated with the selected TCI state and receive DCI having a CRC scrambled with a G-RNTI associated with the service. The UE may receive the MBS data by receiving a PDSCH indicated by the corresponding DCI.

v. The DCI for the G-RNTI may indicate HARQ feedback over a PUCCH or PUSCH. When the DCI indicates HARQ feedback and when HARQ feedback transmission for the corresponding MBS service is activated, the UE may activate an MBS UL BWP associated with the corresponding MBS service and transmit the HARQ feedback in the MBS UL BWP.

It is assumed that the UE is capable of applying (analog) beamforming to DL reception. For example, it is assumed that the UE may receive a DL signal on a specific beam among a plurality of candidate beams. Information for the UE to determine the reception beam for a PDSCH carrying one MBS TB (e.g., one MCCH TB composed of at least one piece of MCCH data or one MTCH TB composed of at least one piece of MTCH channel data) may be information on an MBS RS that is quasi co-located (QCL) in terms of spatial Rx parameters (i.e., QCL source for Type D).

When the UE is in idle/inactive mode (hereinafter referred to as idle/inactive UE), the UE may determine the quality of a cell by measuring the SSB of the corresponding cell. If the UE discovers a plurality of cells, the UE may select a cell with the highest quality (e.g., the highest RSRP measurement value) from among the cells. The UE may camp on the cell by receiving an MIB and SIB1 from the selected cell. Then, the UE may receive other SI messages. In summary, the idle/inactive UE may use the SSB as an MBS RS to determine the optimal beam for MBS reception in the corresponding cell.

When the UE is in connected mode (hereinafter referred to as a connected mode UE), the UE may perform BM. Accordingly, the BS and UE may know and manage the optimal beam for the corresponding UE. In this case, the TCI state of the UE selected by the current BM operation may be applied not only to unicast PDSCH reception but also to broadcast/multicast PDSCH (MBS PDSCH) reception, depending on the MBS transmission method of the BS. The BS may indicate through system information, an MCCH, or UE-dedicated signaling that the UE or the MBS UE in the cell is allowed to use the optimal TCI state selected by the current BM operation for MBS TB reception.

However, the TCI state determined based on the best SSB index of the serving cell or the TCI state determined by the BM of the connected UE may not be suitable for MBS reception, depending on the MBS transmission method of the BS. In this case, the BS may provide a separate MBS RS for the MBS. For example, when the BS configures a separate MBS BWP, the BS may configure MBS-dedicated SSB resources or CSI-RS resources in the corresponding MBS BWP or in the vicinity of the frequency thereof for idle/inactive/connected UEs receiving the MBS in the corresponding MBS BWP.

Accordingly, the BS may indicate as the MBS RS at least one of the following RSs through system information (SIB1 or MBS SIB), MBS control information, or UE-dedicated signaling.

Cell-defining SSB resources of the serving cell (e.g., PCell, PSCell, SCell, etc.)

SSB resources or CSI-RS resources configured in the active BWP

SSB resources or CSI-RS resources configured in the default BWP

SSB resources or CSI-RS resources configured in the configured BWP

SSB resources or CSI-RS resources configured in the MBS BWP

The MBS RS indicated by the BS may be associated with at least one MBS BWP, at least one MCCH reception, at least one MTCH reception, at least one MBS service reception, and/or at least one G-RNTI based transmission.

Figure 8:
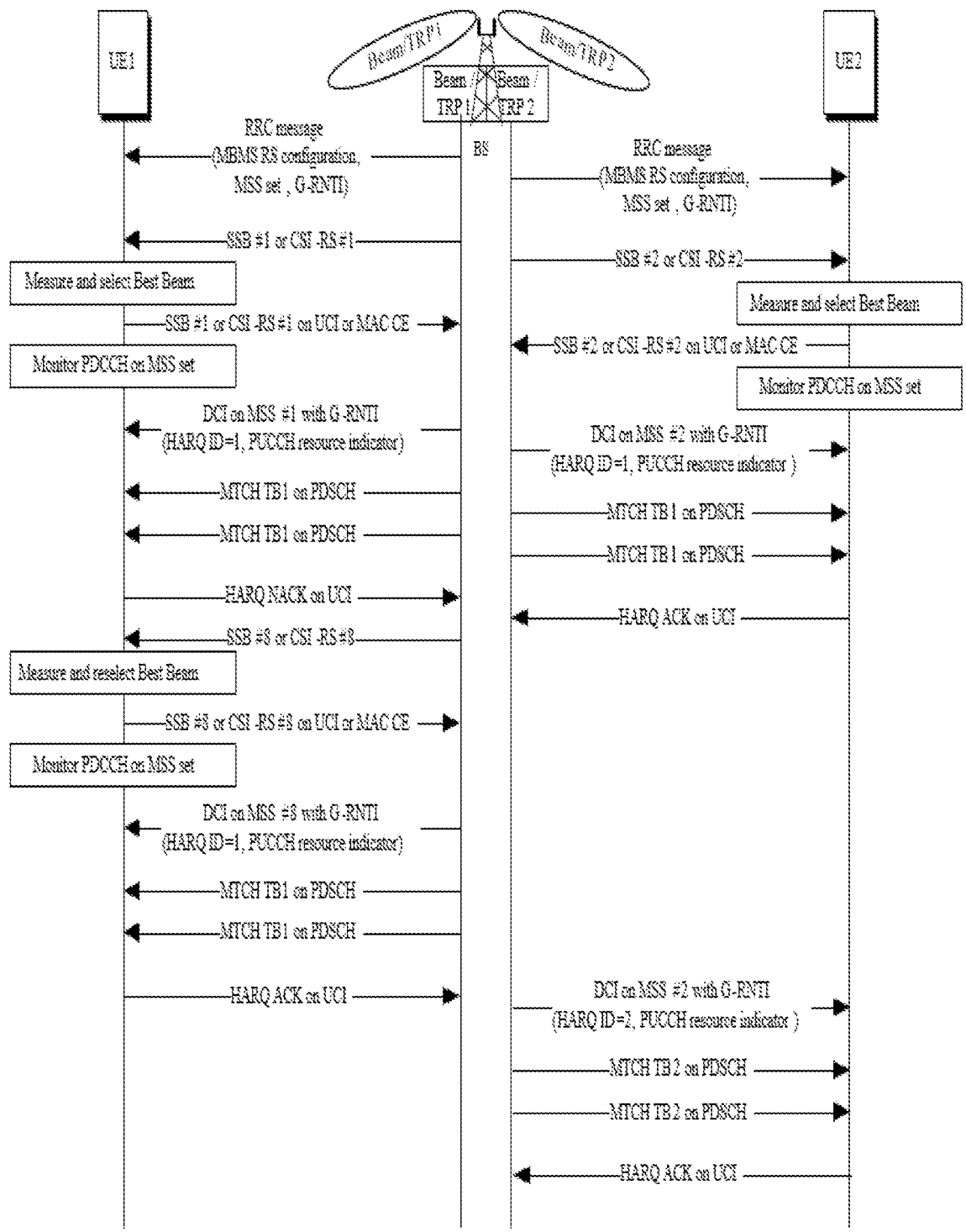
FIG. 8 illustrates a broadcast or multicast based on beams according to an embodiment of the present disclosure.

FIG. 8 illustrates broadcast or multicast transmission based on beams according to an embodiment of the present disclosure.

Referring to FIG. 8, UE 2 may receive initial transmission and retransmission of MTCH TB 1 in the same TCI state (e.g., same TRP/beam). Meanwhile, UE 1 may change the TCI state (e.g., optimal TRP/beam) based on SSB or CSI-RS measurement before retransmission. For example, when the quality of SSB #1 or CSI-RS #1 falls below a threshold and when the quality of SSB #8 or CSI-RS #8 is above the threshold or the quality of SSB #8 or CSI-RS #8 is the highest, the UE may report SSB #8 or CSI-RS #8 to the BS. If the TCI state is capable of being changed between the initial transmission and retransmission of MTCH TB 1, it is possible to receive the initial transmission and retransmission of the same MTCH TB, MTCH TB 1 in different TCI states, that is, from/on different TRPs/beams.

DCI 1 and DCI 2 may schedule PDSCH data transmissions transmitted from/on different TRPs/beams. The UE may report HARQ feedback (e.g., ACK or NACK) according to the decoding result of MTCH TB 1 received over a PDSCH. The BS may allocate PUCCH resources in DCI 1 and DCI 2. If UE 1 reports a NACK and UE 2 reports an ACK, the BS may retransmit MTCH TB 1 with only the TCI state of UE 1. That is, PDCCH/PDSCH transmission may be performed only with a TRP/beam corresponding to the TCI state. For example, in FIG. 2-1 (FIG. 8?), UE 1 may monitor a PDCCH occasion in a CORSET/MSS set of TCI state 8. UE 1 may receive DCI having a CRC scrambled with a G-RNTI over a PDCCH and then obtain MTCH TB 1 after receiving a PDSCH based on the DCI.

On the other hand, UE 2 may monitor a PDCCH occasion in a CORSET/MSS set of TCI state 2. UE 2 may receive DCI having a CRC scrambled with another G-RNTI and then obtain MTCH TB 2 after receiving a PDSCH based on the DCI.

Search Space for MBS

When the connected UE is interested in a specific TMGI service, the connected UE may inform the BS that the UE is interested in the specific TMGI service. In this case, the BS may transmit configuration information on a G-RNTI, BWP (or common frequency resource), SS, and/or CORESET for the specific TMGI service to the UE to allow the UE to receive a PDCCH/PDSCH. Alternatively, the idle/inactive UE may acquire the configuration information on the G-RNTI, BWP (or common frequency resource), SS, and/or CORESET for the specific TMGI service from system information or MCCH messages. Herein, an MBS search space (MSS) may be a CSS, a USS, or a new type of SS.

The BS may configure a new type of CSS, an additional USS, and a new type of MSS for MBS transmission, but in this case, there may be an additional increase in the number of times of blind decoding (BD). In order to minimize an increase in the BD overhead, the BS may configure the SS as follows.

1) Method 1-1: The network may transmit DCI having a CRC scrambled with an SC-RNTI or G-RNTI in the conventional type of CSS. For example, the idle/inactive UE or connected UE may monitor a CSS Type 3 PDCCH or USS PDCCH and receive an MBS PDCCH for the SC-RNTI or G-RNTI based thereon.

2) Method 1-2: The idle/inactive UE or connected UE may monitor a CSS Type 3 PDCCH or USS PDCCH, and reserved bits of DCI having a CRC scrambled with a conventional RNTI (e.g., SFI-RNTI, PS-RNTI, C-RNTI, etc.) may schedule an MBS PDSCH.

3) Method 1-3: The idle/inactive UE or connected UE may monitor a CSS Type 3 PDCCH or USS PDCCH. The BS may configure that specific HARQ process ID(s) indicate MBS PDSCH scheduling with DCI, a MAC CE, or an RRC message. When an MB S-dedicated HARQ process ID is used, some of all HARQ process IDs may be used for unicast PDSCH transmission, and the rest may be used for MBS PDSCH transmission.

The UE may receive the DCI having the CRC scrambled with the SC-RNTI or G-RNTI according to above-described SS method. The SC-RNTI may be used when the DCI schedules a PDSCH for MCCH messages, MTCH scheduling information, or MCCH message notification, and the G-RNTI may be used when the DCI schedules a PDSCH for MTCH data. Upon receiving the MCCH message notification, the UE may recognize a change in the MCCH message. In addition, upon receiving the MTCH scheduling information, the UE may recognize a PDSCH transmission duration for a specific G-RNTI or specific MTCH data.

MBS Search Space Activation

The UE may configure and activate a BWP (or common frequency resource) and monitor a PDCCH in an SS and CORESET. However, there may not always be transmission for MBS services, and in this case, unnecessary power consumption may occur due to continuous PDCCH monitoring of the UE. To reduce power consumption, the BS may trigger the UE to perform PDCCH monitoring in an MSS as follows through DCI or a MAC CE transmitted in an initial DL BWP or unicast DL BWP.

The idle/inactive UE may perform PDCCH monitoring in a CSS of an initial DL BWP. When MBS PDCCH/PDSCH transmission for a specific G-RNTI starts (for example, when an MBS session starts), the BS may transmit DCI in a specific type of CSS of the initial DL BWP in order to trigger UEs that desire to receive the MBS to monitor an SS for MBS reception. For example, the BS may transmit MBS triggering DCI of which the CRC is scrambled with an MBS related RNTI (e.g., SC-RNTI) through CSS Type 3. The MBS triggering DCI or a MAC CE scheduled by the MBS triggering DCI may indicate the specific G-RNTI. Upon receiving the DCI or MAC CE, if the UE is interested in the specific G-RNTI, the UE may start monitoring the SS for MBS reception based on configuration information on an SS and CORESET, which is previously received, and stop the PDCCH monitoring for the MBS triggering DCI.

The connected UE may perform PDCCH monitoring in a CSS or USS of one (unicast) active DL BWP. When MBS PDCCH/PDSCH transmission for a specific G-RNTI starts (for example, when an MBS session starts), the BS transmits DCI in a specific type of CSS or USS of the active DL BWP in order to trigger the corresponding UE that desires to receive the MBS to monitor an SS for MBS reception. For example, the BS may transmit MBS triggering DCI of which the CRC is scrambled with an MBS related RNTI (e.g., SC-RNTI) or C-RNTI through CSS Type 3 or USS ID=X. The MBS triggering DCI or a MAC CE scheduled by the MBS triggering DCI may indicate the specific G-RNTI. Upon receiving the DCI or MAC CE, if the UE is interested in the specific G-RNTI, the UE may start monitoring the SS for MBS reception based on configuration information on an SS and CORESET, which is previously received, and stop the PDCCH monitoring for the MBS triggering DCI.

If a new data indicator (NDI) in DCI is toggled to indicate a new TX and a second MSS after the UE starts monitoring an SS (first MSS) for MBS reception, the UE may start monitoring a PDCCH in the second MSS to receive a retransmission (ReTX) or another new TX and stop monitoring in the first MSS. In this case, the second MSS may provide a CORESET at a short periodicity for retransmission. Meanwhile, when the DCI indicates the first MSS again, the UE may start monitoring the PDCCH in the second MSS and stop the monitoring in the first MSS.

When the UE starts the SS monitoring for MBS reception, the UE may start a specific timer. Upon receiving new G-RNTI DCI, the UE may restart the specific timer. If the specific timer expires and no other G-RNTI DCI is received, the UE may stop the SS monitoring for MBS reception and resume the PDCCH monitoring for the MBS triggering DCI.

In addition, when the MBS PDCCH/PDSCH transmission for the specific G-RNTI is stopped or paused (for example, when the MBS session stops), the BS may transmit stop DCI of which the CRC is scrambled with the specific G-RNTI or MBS related RNTI in the MSS monitored by the UE. The stop DCI or a MAC CE scheduled by the stop DCI may indicate the stop of the specific G-RNTI. Upon receiving the DCI or MAC CE, the UE may stop the SS monitoring for MBS reception and resume the PDCCH monitoring for the MBS triggering DCI.

PDSCH Transmission Based on DCI

When a plurality of UEs desire to receive the same data, the BS may configure a point-to-point (PTP) bearer for transmitting the same data to different UEs for each UE and configure/transmit a UE-dedicated TB to each UE. Alternatively, the BS may configure/transmit a UE-group TB to each of a plurality of UE groups by configuring a PTM bearer for transmitting the same data to the plurality of UEs at once. In this case, the UE-group TB and the UE-dedicated TB may not be combined with each other.

A plurality of PDSCHs where N-th HARQ transmission of the same TB is performed for the same HARQ process ID may be configured as one MBS PDSCH set. For example, in FIG. 8, different PDSCHs for the same TB received by UE 1 and UE 2 are transmitted with different RSs or different TCI states, and these PDSCHs may be configured as one MBS PDSCH set. In the MBS PDSCH set, each PDSCH transmission where the N-th HARQ transmission is performed for the same HARQ process ID may be scheduled by at least one DCI. For example, when the CRC of the DCI is scrambled with a G-RNTI, the corresponding DCI may indicate N-th TB transmission to a plurality of UEs. In addition, when the CRC of the DCI is scrambled with a C-RNTI, the corresponding DCI may indicate N-th TB transmission to a specific UE. In the case of the C-RNTI, PDSCH resources in the PDSCH set may be for UE-dedicated PDSCH transmission or UE-group PDSCH transmission shared by a plurality of UEs, depending on the contents of the DCI. Meanwhile, HARQ A/N for the PDSCH transmission may be transmitted on a UE-dedicated PUCCH resource or a UE-group PUCCH resource shared by a plurality of UEs.

1) Method 2-1: The CRC of DCI may be scrambled with a G-RNTI, and a UE-group MBS TB may be transmitted/retransmitted on a UE-group MBS PDSCH. In this case, the MBS TB may be configured with PTM bearer data for the G-RNTI. In Method 2-1, the DCI may be transmitted/received over a CSS PDCCH or MSS PDCCH.

The DCI of Method 2-1 may be transmitted and received after being scrambling as shown in Table 6 below. In this case, the parameters of Table 6 for initializing a scrambling sequence generator may be RRC parameters configured by the BS, which may be configured for the G-RNTI. Alternatively, the parameters may be configured for a BWP or cell for the G-RNTI DCI transmission.

iii. If the DCI field of Method 2-2 indicates a cell index or a BWP ID, the UE may receive the UE-group MBS PDSCH from a cell indicated by the corresponding cell index or from a BWP indicated by the corresponding BWP ID.

3) Method 2-3: The CRC of DCI is scrambled with a C-RNTI, and a UE-group MBS TB may be transmitted/retransmitted over a UE-dedicated MBS PDSCH. In this case, the MBS TB may be configured with PTM bearer data for a G-RNTI. In Method 2-3, the DCI may be transmitted/received over a CSS PDCCH, MSS PDCCH, or USS PDCCH.

The UE may receive N-th HARQ transmission of a specific TB on the PDSCH of Method 2-1/2-2 and receive (N+1)-th HARQ transmission of the same specific TB on the PDSCH of Method 2-3. In this case, DCIs according to different methods may indicate the same HARQ process ID. The DCI of Method 2-3 may indicate whether the N-th HARQ transmission and the (N+1)-th HARQ transmission

TABLE 6

The UE shall assume the block of bits b(0), . . . , b ($M_{bit}$ − 1), where $M_{bit}$ is the number of bits transmitted on the physical channel, is scrambled prior to modulation, resulting in a block of scrambled bits $\tilde{b}$(0), . . . , $\tilde{b}$($M_{bit}$ − 1) according to
 $\tilde{b}(i) = (b(i) + c(i))$ mod 2
where the scrambling sequence c(i) is given by clause 5.2.1. The scrambling sequence generator shall be initialized with
 $c_{init} = (n_{RNTI} \cdot 2^{16} + n_{ID})\mathrm{mod}2^{31}$
where
 - for a MBS specific search space, $n_{ID} \in \{0.1, \ldots, 65535\}$ equals the higher-layer parameter pdcch-DMRS-ScramblingID for the G-RNTI if configured,
 - $n_{ID} = N_{ID}^{cell}$ otherwise
and where
 - $n_{RNTI}$ is given by the G-RNTI for a PDCCH in a MBS specific search space if the higher-layer parameter pdcch-DMRS-ScramblingID is configured for the G-RNTI, and
 - $n_{RNTI} = 0$ otherwise.

2) Method 2-2: The CRC of DCI may be scrambled with a C-RNTI, and a UE-group MBS TB may be transmitted/retransmitted on a UE-group MBS PDSCH. In this case, the MBS TB may be configured with PTM bearer data for a G-RNTI. The UE-group MBS PDSCH may be transmission for a specific G-RNTI. The BS may transmit the DCI to a specific UE receiving the MBS PDSCH based on the C-RNTI of the specific UE and schedule the MBS PDSCH in the corresponding DCI. The UE may determine the G-RNTI of the UE-group MBS PDSCH based on an MCCH message, a UE-dedicated RRC message, or a DCI field. In Method 2-2, the DCI may be transmitted/received over a CSS PDCCH, MSS PDCCH, or USS PDCCH.

i. The UE may receive N-th HARQ transmission of a specific TB over the PDSCH of Method 2-1/2-3 and receive (N+1)-th HARQ transmission of the same specific TB over the PDSCH of Method 2-2. In this case, DCIs according to different methods may indicate the same HARQ process ID. The DCI of Method 2-2 may indicate that the N-th HARQ transmission and the (N+1)-th HARQ transmission are capable of being combined. According to this indication, the UE may combine the N-th HARQ transmission and the (N+1)-th HARQ transmission. In this case, the DCI field of Method 2-2 may indicate the G-RNTI related to the PDSCH of the N-th HARQ transmission.

ii. The DCI field of Method 2-2 may indicate a plurality of G-RNTIs, and in this case, transmission of a plurality of UE-group MBS PDSCHs related to the plurality of indicated G-RNTIs may be scheduled. Accordingly, the UE may receive multiple TBs for multiple G-RNTIs with one DCI.

are capable of being combined. According to this indication, the UE may combine the N-th HARQ transmission and the (N+1)-th HARQ transmission. In this case, the DCI field of Method 2-3 may indicate the G-RNTI related to the UE-group MBS PDSCH of the N-th HARQ transmission.

4) Method 2-4: The CRC of DCI is scrambled with a C-RNTI, and a UE-dedicated TB configured with PTP bearer data may be transmitted/retransmitted over a UE-dedicated MBS PDSCH. In Method 2-4, the DCI may be transmitted/received over a CSS PDCCH, MSS PDCCH, or USS PDCCH.

The DCI may indicate whether the PDSCH based on Method 2-1/2-2/2-3 and the PDSCH based on Method 2-4 are capable of being combined. In this case, non-combining may be indicated by default.

SS Configuration for MBS Transmission and Reception

For an SS for MBS transmission and reception, at least one SS ID may be associated with at least one TMGI, at least one G-RNTI, and/or at least one SC-RNTI. For example, a CSS with a long monitoring slot periodicity may be associated with a TMGI/G-RNTI/SC-RNTI where data transmission occurs intermittently, and a CSS with a short monitoring slot periodicity may be associated with a TMGI or G-RNTI where data transmission occurs frequently.

In current NR, it is configured that one SS ID is associated with one CORESET ID.

However, when a plurality of MBS PDCCHs are configured as one PDCCH set that schedules PDSCHs for the same TB and when a plurality of PDCCHs in one PDCCH set are transmitted in association with different RSs or different TCI states, MBS related SS(s) for one PDCCH set may be configured according to at least some of the following methods.

1) Method 3-1: One SS group may be configured for one PDCCH set, and multiple SS IDs may be assigned to one SS Group. Different SS IDs may be associated with different RSs or different TCI states, and the different SS IDs may be configured to have the same CORESET ID. One SS group may be associated with at least one G-RNTI/SC-RNTI or at least one TMGI.

For example, IE SearchSpace in Table 7 below corresponds to one SS set with one SS ID. N SS sets (or IE SearchSpace configurations) may be provided for one TMGI/one G-RNTI/one SC-RNTI, and different SS sets may be configured as different searchSpaceId with same controlResourceSetId. SSB indices/CSI-RS indices associated with different searchSpaceId may be configured by spatialRelationInfo.

TABLE 7

SearchSpace ::= SEQUENCE {
searchSpaceId SearchSpaceId,
controlResourceSetId ControlResourceSetId
monitoringSlotPeriodicityAndOffset
duration INTEGER (2..2559)
monitoringSymbolsWithinSlot BIT STRING (SIZE (14))
nrofCandidates SEQUENCE {
aggregationLevel1 ENUMERATED {n0, n1, n2, n3, n4, n5, n6, n8},
aggregationLevel2 ENUMERATED {n0, n1, n2, n3, n4, n5, n6, n8},
aggregationLevel4 ENUMERATED {n0, n1, n2, n3, n4, n5, n6, n8},
aggregationLevel8 ENUMERATED {n0, n1, n2, n3, n4, n5, n6, n8},
aggregationLevel16 ENUMERATED {n0, n1, n2, n3, n4, n5, n6, n8}
}
spatialRelationInfo 2) Method 3-2: The network may allocate one SS ID for one PDCCH set and configure to have one CORESET ID in an SS. In this case, the duration of the SS or the CORESET may be allocated to different RSs or different TCI states. Alternatively, each bit of monitoringSymbolsWithinSlot configured in the form of a bitmap in the SS may be configured to be associated with the same or different RSs or different TCI states. At least one G-RNTI/SC-RNTI or at least one TMGI may be associated with one SS ID.

Figure 9:
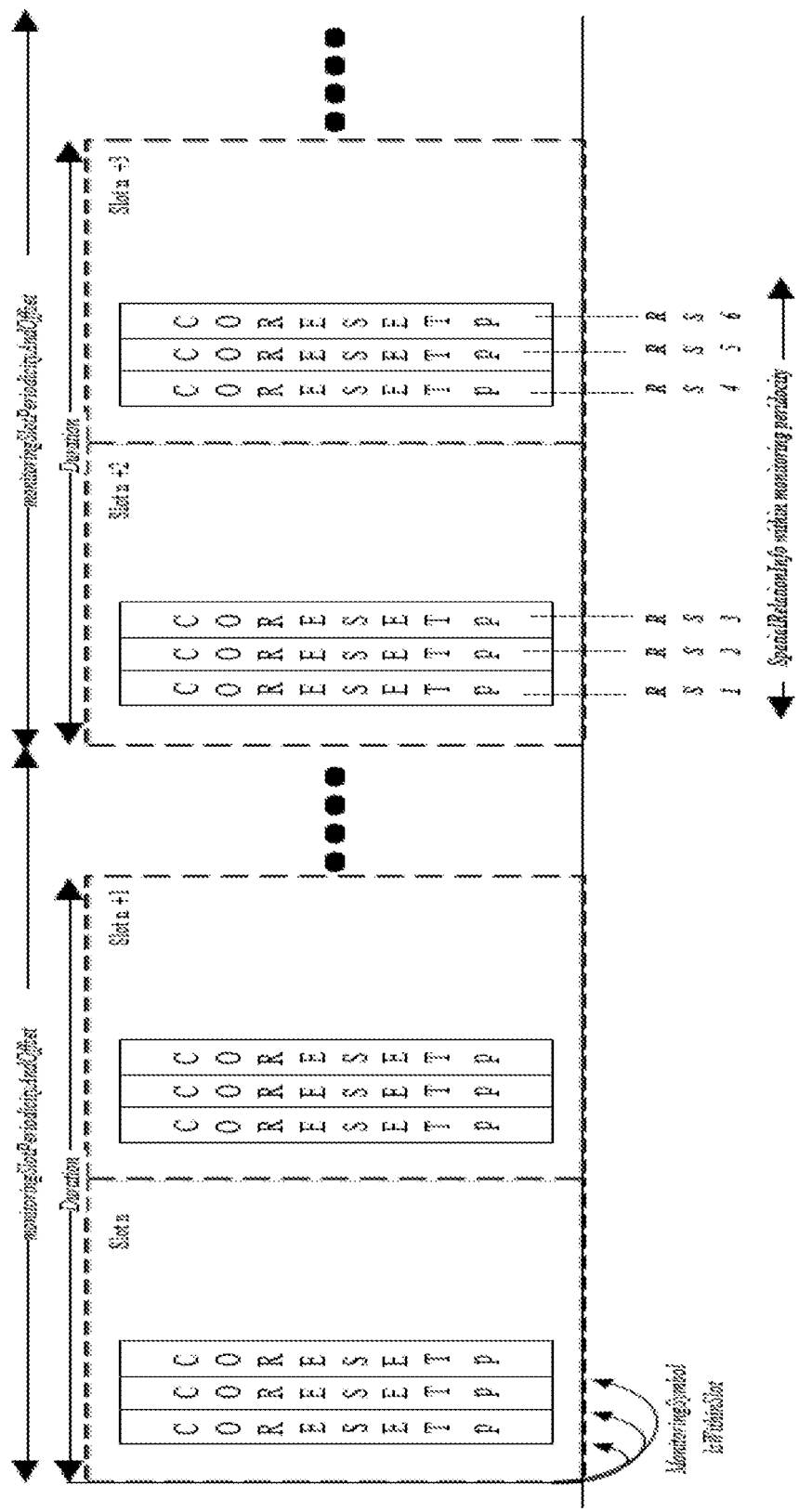
FIG. 9 illustrates exemplary configurations of a multicast broadcast service (MBS) related search space (SS) and a control resource set (CORESET) for supporting multiple reference signals (RSs) (e.g., Method 3-2)

FIG. 9 illustrates exemplary configurations of an MBS related SS and a CORESET for supporting multiple RSs (e.g., Method 3-2).

For example, if the duration of an SS is two slots as shown in FIG. 9, the BS may configure three CORESETs for each slot so that 6 CORESETs appear for each monitoring periodicity. In this case, all CORESETs may have the same CORESET ID. The 6 CORESETs repeated at each monitoring periodicity may be associated with the same or different RSs. For example, the association shown in Table 8 below may be allowed.

TABLE 8

Association of a plurality of RSs with a plurality of CORESET locations
Odd-numbered CORESETs among 6 CORESETs = SSB index 1, 2
Even numbered CORESETs among 6 CORESETs = SSB index 3, 4
Association of one RS with a plurality of CORESET locations
Odd-numbered CORESETs among 6 CORESETs = SSB index 1
Even numbered CORESETs among 6 CORESETs = SSB index 2
Association of a plurality of RSs with one CORESET location
First CORESET among 6 CORESETs = SSB index 1, 2
Second CORESET among 6 CORESETs = SSB index 2, 3
Third CORESET among 6 CORESETs = SSB index 3, 4

TABLE 8-continued

Fourth CORESET among 6 CORESETs = SSB index 4, 5
Fifth CORESET among 6 CORESETs = SSB index 5, 6
Sixth CORESET among 6 CORESETs = SSB index 7, 8

For example, IE SearchSpace in Table 9 below corresponds to one SS set with one SS ID. One SS set may be configured for one TMGI, one G-RNTI, or one SC-RNTI. Different SSB indices/CSI-RS indices in spatialRelationInfoList may be associated with different values of durationList or monitoringSymbolsWithinSlotList.

TABLE 9

SearchSpace ::= SEQUENCE {
searchSpaceId SearchSpaceId,
controlResourceSetId ControlResourceSetId
monitoringSlotPeriodicityAndOffset
durationList ::= SEQUENCE (SIZE(1..maxNrofsptialRelation))
OF duration
duration INTEGER (2..2559)
monitoringSymbolsWithinSlot BIT STRING (SIZE (14))
nrofCandidates SEQUENCE {
aggregationLevel1 ENUMERATED {n0, n1, n2, n3, n4, n5, n6, n8},
aggregationLevel2 ENUMERATED {n0, n1, n2, n3, n4, n5, n6, n8},
aggregationLevel4 ENUMERATED {n0, n1, n2, n3, n4, n5, n6, n8},
aggregationLevel8 ENUMERATED {n0, n1, n2, n3, n4, n5, n6, n8},
aggregationLevel16 ENUMERATED {n0, n1, n2, n3, n4, n5, n6, n8}
}
spatialRelationInfoList 3) Method 3-3: The BS may allocate one SS ID for one PDCCH set and configure to have a plurality of CORESET IDs in an SS. In this case, the plurality of CORESET IDs may be configured to be associated with different RSs or different TCI states. At least one G-RNTI/SC-RNTI and/or at least one TMGI may be associated with one SS ID.

For example, IE SearchSpace in Table 10 below corresponds to one SS set with one SS ID. One SS set may be configured for one TMGI, one G-RNTI, or one SC-RNTI. Different SSB indices/CSI-RS indices in spatialRelationInfoList may be associated with different controlResourceSetId of controlResourceSetIdList.

TABLE 10

SearchSpace ::= SEQUENCE {
searchSpaceId SearchSpaceId,
controlResourceSetIdList::= SEQUENCE
(SIZE(1..maxNrofsptialRelation)) OF
controlResourceSetId
monitoringSlotPeriodicityAndOffset
duration INTEGER (2..2559)
monitoringSymbolsWithinSlot BIT STRING (SIZE (14))
nrofCandidates SEQUENCE {
aggregationLevel1 ENUMERATED {n0, n1, n2, n3, n4, n5, n6, n8},
aggregationLevel2 ENUMERATED {n0, n1, n2, n3, n4, n5, n6, n8},
aggregationLevel4 ENUMERATED {n0, n1, n2, n3, n4, n5, n6, n8},
aggregationLevel8 ENUMERATED {n0, n1, n2, n3, n4, n5, n6, n8},
aggregationLevel16 ENUMERATED {n0, n1, n2, n3, n4, n5, n6, n8}
}
spatialRelationInfoList 4) Method 3-4: The BS may configure one SS group for one PDCCH set and allocate a plurality of SS IDs to one SS group. Different SS IDs may be associated with different RSs or different TCI states, and the different SS IDs may be configured to have different CORESET IDs. One SS group may be associated with at least one G-RNTI/SC-RNTI or at least one TMGI.

For example, IE SearchSpace in Table 11 below corresponds to one SS set with one SS ID. N SS sets may be configured for one TMGI, one G-RNTI, or one SC-RNTI. Different SS sets may be configured with different searchSpaceId with same or different controlResourceSetId. SSB indices/CSI-RS indices associated with different searchSpaceId may be configured by spatialRelationInfo. If controlResourceSetId is different, CORESETs having different size resources for different SS IDs may be configured.

TABLE 11

SearchSpace ::= SEQUENCE {
searchSpaceId SearchSpaceId,
controlResourceSetId ControlResourceSetId
monitoringSlotPeriodicityAndOffset
duration INTEGER (2..2559)
monitoringSymbolsWithinSlot BIT STRING (SIZE (14))
nrofCandidates SEQUENCE {
aggregationLevel1 ENUMERATED {n0, n1, n2, n3, n4, n5, n6, n8},
aggregationLevel2 ENUMERATED {n0, n1, n2, n3, n4, n5, n6, n8},
aggregationLevel4 ENUMERATED {n0, n1, n2, n3, n4, n5, n6, n8},
aggregationLevel8 ENUMERATED {n0, n1, n2, n3, n4, n5, n6, n8},
aggregationLevel16 ENUMERATED {n0, n1, n2, n3, n4, n5, n6, n8}
}
spatialRelationInfo MBS PDCCH Monitoring Rule PDCCH candidates to be monitored by the UE among a plurality of SS sets may be determined/limited by the BD limit (e.g., the maximum number of PDCCH candidates for BD) and CCE limit (e.g., the maximum number of non-overlapping CCEs) of the UE.

In current NR, all CSSs take precedence over any USSs. In addition, it is configured that when the UE performs PDCCH monitoring for CSSs, the UE assumes that the PDCCH monitoring does not exceed the BD limit and CCE limit of the UE. PDCCH candidates for a CSS may not be dropped. On the other hand, if CSS(s) and USS(s) overlap in one slot, the UE may exceed at least one of the BD limit and/or CCE limit of the UE due to the USS(s) (that is, monitoring and/or channel estimation required for the UE may exceed at least one of the BD limit and/or CCE limit of the UE). Specifically, SSs that the UE is capable of monitoring within one slot may be limited by UE capability related to BD and UE capabilities related to channel estimation. That is, the SS sets that the UE is capable of monitoring in one slot may be determined based on the maximum number of times of BD that the UE is capable of performing in one slot (i.e., the number of PDCCH candidates) and the maximum number of non-overlapping CCEs (where the UE is capable of performing channel estimation). When CSS set(s) and USS set(s) overlap in one slot, if the number of all PDCCH candidates of the overlapping SS sets exceeds the maximum number of PDCCH candidates that the UE is capable of monitoring or if the number of non-overlapping CCEs exceeds the maximum number of CCEs where the UE is capable of performing channel estimation, the UE needs to determine at least one SS to be dropped in monitoring according to priorities. All PDCCH candidates included in the dropped SS may be excluded from monitoring targets of the UE (for example, the dropping is performed in units of SS rather than at the candidate level). According to the current NR Rel. 15/16 specifications, the UE excludes a CSS from SS dropping (a CSS always has a higher priority than a USS) and drops USS(s) starting from the lowest priority USS among USS(s). For example, when the UE performs SS dropping in a USS group(s), the UE prioritizes a USS with a low SS ID value than a USS with a high SS ID value (that is, the UE drops the USS with the high SS ID first). Accordingly, in this case, all PDCCH candidates in the USS having the high SS ID value in the corresponding slot may be dropped. That is, the UE does not monitor the corresponding PDCCH candidates.

Figure 10:
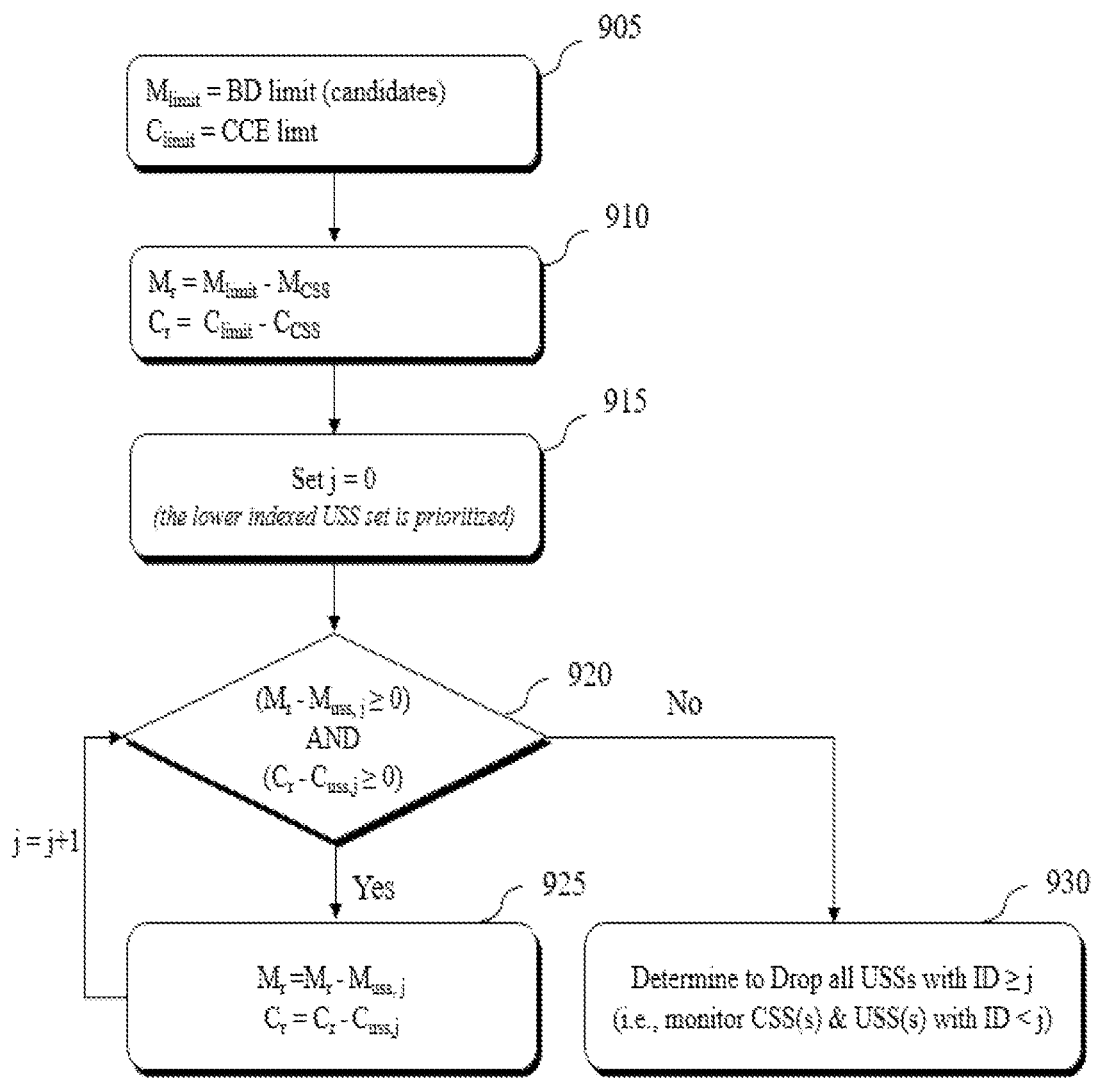
FIGS. 10 and 11 are diagrams for explaining methods of determining SSs for monitoring a physical downlink control channel (PDCCH)

FIG. 10 is a diagram for explaining a method of determining a monitoring SS (PDCCH candidates) in a current NR system supporting no MBS. Referring to FIG. 10, $M_{limit}$ denotes the BD limit (the maximum number of candidates capable of being monitored) of the UE within one slot, and $CCE_{limit}$ denotes the CCE limit of the UE (905). First, the UE subtracts the total number of all candidates for all CSSs, $M_{CSS}$ and the total number of all non-overlapping CCEs, $C_{CSS}$ from $M_{limit}$ and $CCE_{limit}$, respectively (910). $M_r$ and $C_r$ denote the number of residual candidates that the UE is capable of monitoring after the subtraction and the number of CCEs after the subtraction, respectively. For an SS set group consisting of only USSs, indexing may be performed sequentially again in descending order of SS IDs of each USS. To avoid obscuring the point, the re-indexing will not be described in detail herein. The lower the SS ID, the higher the priority of the USS. $M_{uss,j}$ and $C_{uss,j}$ denote the numbers of candidates and CCEs included in USS (j) having the j-th lowest index, respectively. If the UE is capable of monitoring USS (j) based on the residual processing capabilities of the UE: $M_r$ and $C_r$ (YES in 920), the numbers of candidates and CCEs of USS (j) are subtracted (925). Then, the UE determines whether the UE is capable of monitoring USS (j+1) of the next index (where j=j+1) (920). If the UE is incapable of monitoring USS (j) based the residual processing capabilities of the UE: $M_r$ and $C_r$ (NO in 920), the UE drops USS (j) and subsequent USSs and then performs monitoring for the CSSs and up to USS (j−1) only (930).

If an SS for the MBS is configured, a new PDCCH monitoring (or SS dropping) rule is required in consideration of the MBS related SS. For example, the following methods may be considered. In the methods below, an MBS related CSS (i.e., a new type or CSS) may be replaced/referred with/to as an MSS.

1) Method 4-1: The BS may configure at least one (new type) CSS for the MBS, and the UE may compare the (new type) CSS ID for the MBS configured by the BS with the SS IDs of conventional CSSs (e.g., non-MBS CSSs). In this case, a CSS having a low SS ID may be prioritized. For example, when the CSS ID of conventional CSS Type 3 is higher than the (new type) MBS related CSS ID and when at least one of the BD limit and/or CCE limit of the UE is exceeded (by the number of candidates and/or non-overlapping CCEs configured for the UE) in a specific slot, the UE may drop monitoring of all PDCCH candidates of CC Type 3 in the specific slot. However, the (new type) MBS related CSS may be prioritized over all USSs.

For example, the BS may map a high-priority MBS PDCCH to a CSS with a low CSS ID and map a low-priority MBS PDCCH to a CSS with a high CSS ID.

According to specifications, the BS may be restricted to always configure the IDs of (new type) MBS related CSSs higher than the CSS IDs of conventional CSSs. For example, MBS related CSS(s) may be defined to have lower priorities than any non-MBS CSS(s).

2) Method 4-2: The BS may configure at least one (new type) CSS for the MBS, and the UE may always prioritize conventional CSSs (e.g., non-MBS CSSs) over MBS related CSS(s), regardless of SS IDs. For example, if SS dropping needs to be performed on CSSs, the UE may be defined to drop the MBS related CSS(s) first (than non-MBS CSSs). In this case, among the (new type) MBS related CSS(s), a CSS with a low CSS ID may be prioritized (that is, the CSS with the low CSS ID may be dropped later). For example, even when the CSS ID of conventional CSS Type 3 is higher than the ID of a (new type) MBS related CSS within the same slot, if the BD limit and/or CCE limit of the UE is exceeded (by the number of candidates and/or non-overlapping CCEs configured for the UE) in a specific slot, the UE may drop monitoring of all PDCCH candidates of the (new type) MBS related CSS (which is determined to be dropped) in the specific slot. In addition, if the IDs of MBS related CSSs in the same specific slot exceed the BD limit and/or CCE limit of the UE, the UE may prioritize a CSS with a low CSS ID (that is, drops the CSS with the low CSS ID later) and drop monitoring of all PDCCH candidates of the (new type) MBS related CSS with a high CSS ID (which is determined to be dropped first).

Figure 11:
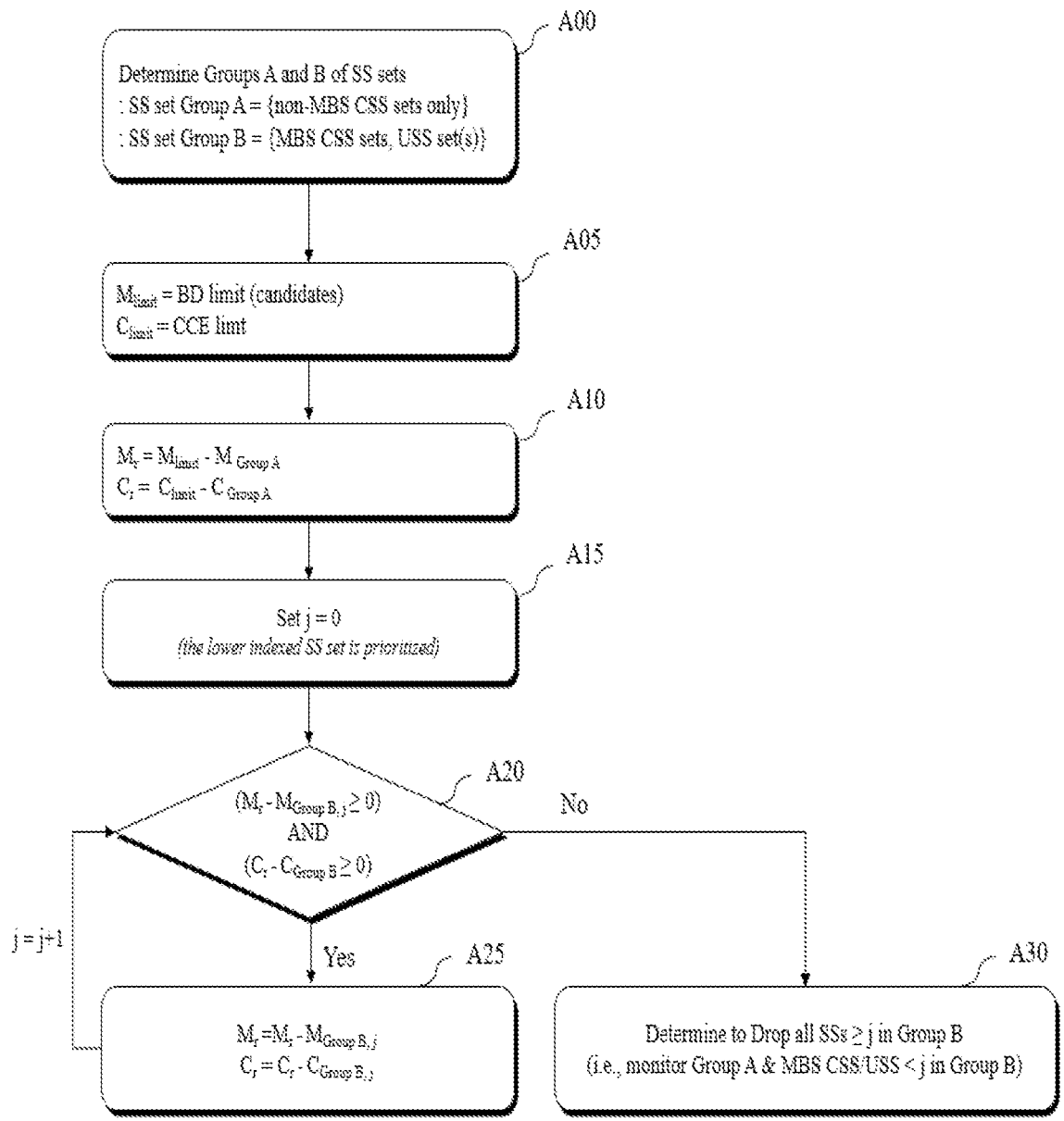

As an implementation example, the UE may compare an MBS related CSS ID and a USS ID and then prioritize an SS having a lower SS ID. For example, if the MBS related CSS ID is lower than the USS ID, the MBS related CSS takes precedence over the corresponding USS (that is, the MBS related CSS is dropped later (if necessary)). If the MBS related CSS ID is higher than the USS ID, monitoring of all PDCCH candidates of the corresponding MBS related CSS (which is determined to be dropped) may be dropped. FIG. 11 is a diagram for explaining a method of determining an SS set for PDCCH transmission/reception according to Method 4-2. The operations of FIG. 11 may be performed by a BS that maps a PDCCH to a specific PDCCH candidate and transmits and/or a UE that monitors a PDCCH candidate. Referring to FIG. 11, the UE may be configured with a plurality of SS sets through higher layer signaling. Configuration information on each of the SS sets may include information on a monitoring periodicity, and the plurality of SS sets may overlap in a specific slot. For example, N SS sets may overlap in a specific slot corresponding to the least common multiple of N monitoring periodicities of the N SS sets. When the N SS sets overlap, the N SS sets may be divided into SS set group A and SS set group B (A00). Group A consists only of CSS sets, but a CSS set configured for the MBS may be excluded from group A. Group B may include all remaining SS sets except for those of group A. When CSS(s) for the MBS are configured, the CSS(s) for the MBS belongs to group B. In addition, USS(s) belong to group B. In each group, re-indexing may be performed in ascending order of SS set IDs, starting from the lowest SS set ID. To avoid confusion with SS set IDs, a re-indexed index is referred to as an index G. For example, when K CSSs are included in group A, indices G of {0, 1, 2, . . . , K−1} may be assigned to the corresponding K CSSs (where K>1). num denotes the BD limit of the UE within one slot (e.g., a value based on the maximum number of candidates capable of being monitored in each slot), and $CCE_{limit}$ denotes the CCE limit of the UE (e.g., a value based on the maximum number of CCEs in each slot) (A05). First, the total number of all candidates for all CSSs in group A, $M_{Group\_A}$ and the total number of all non-overlapping CCEs $C_{Group\_A}$ are subtracted from $M_{limit}$ and $CCE_{limit}$, respectively (A10). Herein, the subtraction may mean that monitoring of a corresponding SS set is performed. Monitoring may be performed on all CSSs in group A. $M_r$ and $C_r$ denote the number of residual candidates that the UE is capable of monitoring after the subtraction and the number of CCEs after the subtraction, respectively. In group B, the lower the SS set ID (that is, the lower the index G), the higher the priority. $M_{Group\_B,j}$ and $C_{Group\_B,j}$ denote the numbers of candidates and non-overlapping CCEs included in SS (j) having the j-th lowest index G in group B, respectively. SS (j) may be a CSS for the MBS or a USS. If the UE is capable of monitoring SS (j) based on the residual processing capabilities of the UE: $M_r$ and $C_r$ (YES in A20), the numbers of candidates and CCEs of SS (j) are subtracted (A25). Then, the UE/BS determines whether the UE is capable of monitoring USS (j+1) of the next index G (where j=j+1) (A20). If the UE is incapable of monitoring SS (j) based on the residual processing capabilities of the UE: $M_r$ and $C_r$ (NO in A20), the UE/BS may drop all SSs after SS (j) and perform monitoring for group A and up to SS (j−1) of group B only (A30).

As another example, the UE may prioritize all MBS related CSSs over all USSs, but the present disclosure is not limited thereto.

3) Method 4-3: The BS may configure at least one (new type) CSS for the MBS, and the UE may compare the (new type) CSS ID for the MBS configured by the BS with the SS IDs of conventional CSSs/USSs (e.g., non-MBS CSSs/USSs). In this case, a CSS/USS having a low SS ID may be prioritized (that is, the CSS/USS having the low SS ID may be dropped later). For example, when the CSS ID of conventional CSS Type 3 or a USS is higher than the ID of a (new type) MBS related CSS and when at least one of the BD limit and/or CCE limit of the UE is exceeded (by the number of candidates and/or non-overlapping CCEs configured for the UE) in a specific slot, the UE may drop monitoring of all PDCCH candidates of CC Type 3 or the USS in the specific slot.

In this case, a high CSS ID may be higher than some USS IDs. When the at least one of the BD limit and/or CCE limit of the UE is exceeded (by the number of candidates and/or non-overlapping CCEs configured for the UE) in the specific slot, the UE may monitor PDCCH candidates for a low USS ID in the specific slot and drop monitoring of all PDCCH candidates for the high CSS ID.

4) Method 4-4: The BS may configure at least one (new type) CSS for the MBS, and the UE may always prioritize conventional CSSs/USSs over the (new type) MBS related CSS configured by the BS. For example, even when the CSS ID of conventional CSS Type 3 or a USS is higher than the ID of the (new type) MBS related CSS, if the BD limit and/or CCE limit of the UE is exceeded (by the number of candidates and/or non-overlapping CCEs configured for the UE) in a specific slot, the UE may drop monitoring of all PDCCH candidates of the corresponding MBS related CSS in the specific slot.

In the above, RS configuration methods for broadcast and multicast transmission, CORSET/SS set determination methods, PDSCH transmission/reception methods based on DCI, etc. have been reviewed. When the UE transmits and receives both MBS and unicast transmissions, the UE may perform efficient PDCCH monitoring based on the above methods.

Figure 12:
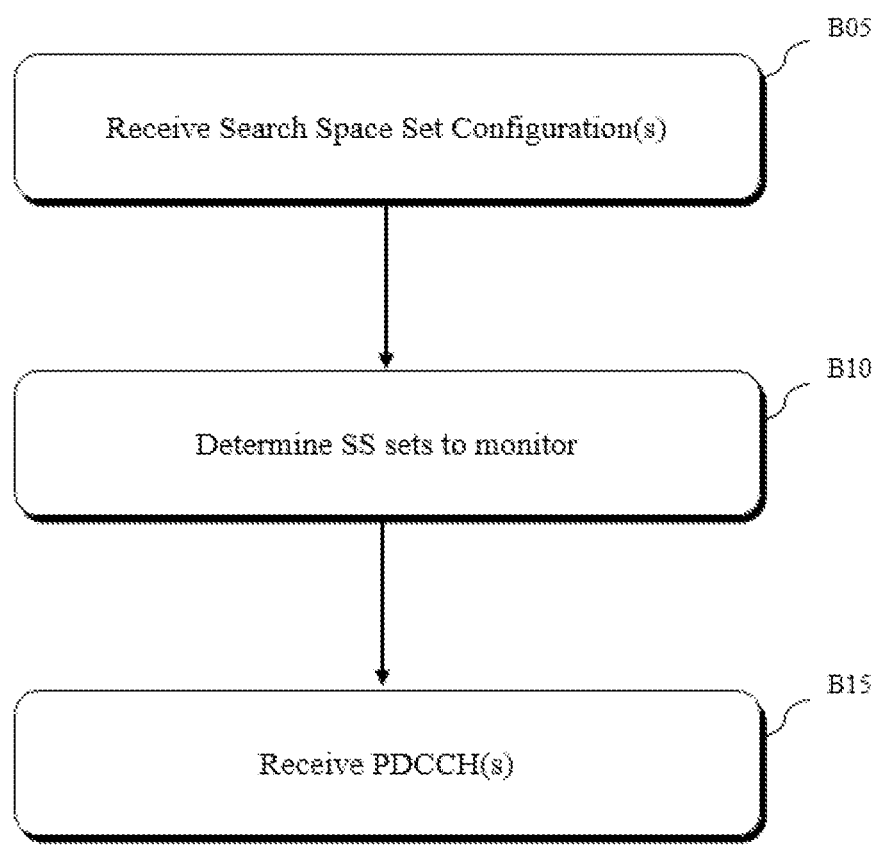
FIGS. 12 and 13 illustrate signal transmission and reception flows according to embodiments of the present disclosure.

FIG. 12 is a diagram for explaining operations of a UE according to an embodiment of the present disclosure. The UE may receive a PDCCH including one or more CCEs. FIG. 12 is a particular implementation of the above-described examples, and thus the scope of the present disclosure is not limited to FIG. 12. The details described above may be referred to in FIG. 12.

Referring to FIG. 12, the UE may receive configurations for a plurality of SS sets including one or more CSS sets and one or more USS sets (B05).

The UE may determine at least one monitoring SS set to be monitored by the UE in a specific slot configured with two or more of the plurality of SS sets, based on a first threshold related to a PDCCH blind detection limit of the UE and a second threshold related to a CCE processing limit of the UE (B10).

The UE may receive at least one PDCCH signal in the specific slot based on PDCCH candidates included in the determined at least one monitoring SS set (B15).

Based on that the one or more CSS sets include a CSS set for an MBS and that the CSS set for the MBS is configured in the specific slot, the UE may determine to monitor all remaining first CSS sets except for the CSS set for the MBS among first CSS sets configured in the specific slot; and select second SS sets to be additionally monitored by the UE from among the CSS set for the MBS and USS sets configured in the specific slot based on each SS set index until the UE reaches either the first threshold or the second threshold.

Among the CSS set for the MBS and the USS sets configured in the specific slot, SS sets not selected by the UE may be dropped from monitoring of the UE.

Among the CSS set for the MBS and the USS sets configured in the specific slot, an SS set with a lower SS set index may have a higher monitoring priority.

Each of the all remaining first CSS sets may have a higher monitoring priority than the CSS set for the MBS and the USS sets configured in the specific slot.

Based on that the UE reaches either the first threshold or the second threshold, the CSS set for the MBS may be dropped from PDCCH monitoring of the UE, but the all remaining first CSS sets may not be dropped.

Based on that an SS set index of the CSS set for the MBS is higher than an SS set index of a first USS and that the UE reaches either the first threshold or the second threshold, the UE may select the first USS and drop the CSS set for the MBS.

Each of the configurations for the plurality of SS sets may include a monitoring periodicity and an SS set index of each SS set.

The all remaining first CSS sets except for the CSS set for the MBS may be related to at least one of CSS Type0, CSS Type0A, CSS Type1, or CSS Type2 of 3GPP based wireless communication.

Based on selection of the CSS set for the MBS, the UE may monitor a UE-group PDCCH in the CSS set for the MBS based on a G-RNTI, and a scrambling sequence initialization parameter for the UE-group PDCCH may be configured by higher layer signaling or set as a cell identifier.

Figure 13:
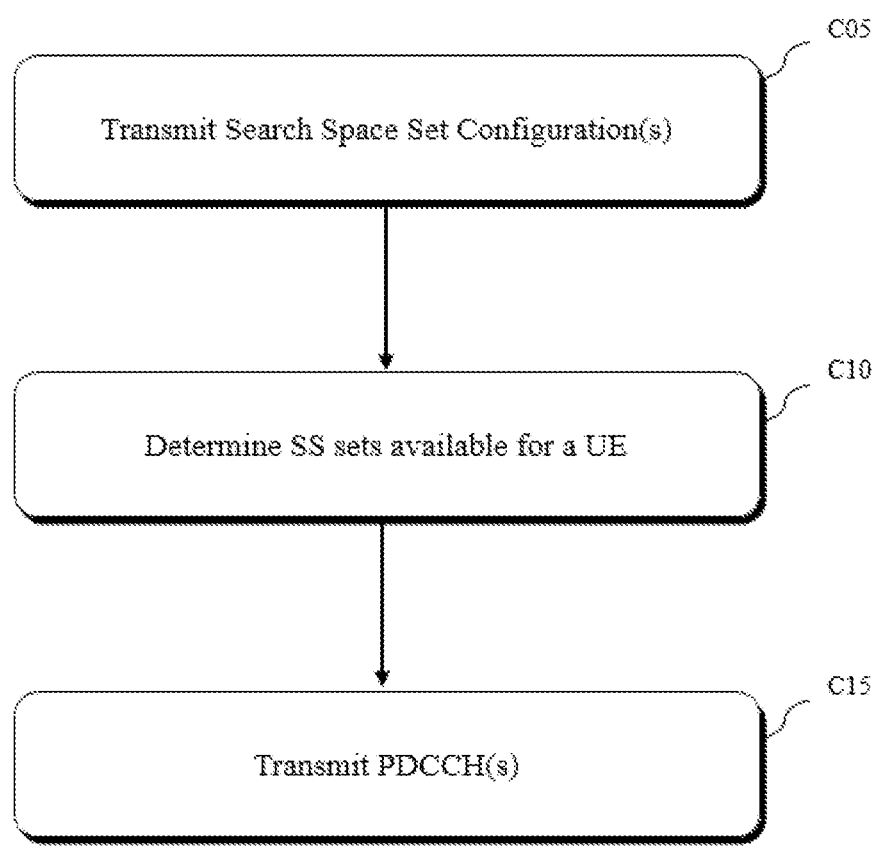

FIG. 13 is a diagram for explaining operations of a BS according to an embodiment of the present disclosure. The BS may transmit a PDCCH including one or more CCEs. FIG. 13 is a particular implementation of the above-described examples, and thus the scope of the present disclosure is not limited to FIG. 13. The details described above may be referred to in FIG. 13.

Referring to FIG. 13, the BS may transmit to a UE configurations for a plurality of SS sets including one or more CSS sets and one or more USS sets (C05).

The BS may determine at least one monitoring SS set to be monitored by the UE in a specific slot configured with two or more of the plurality of SS sets, based on a first threshold related to a PDCCH blind detection limit of the UE and a second threshold related to a CCE processing limit of the UE (C10).

The BS may transmit to the UE at least one PDCCH signal in the specific slot based on PDCCH candidates included in the determined at least one monitoring SS set (C15).

Based on that the one or more CSS sets include a CSS set for an MBS and that the CSS set for the MBS is configured in the specific slot, the BS may include all remaining first CSS sets except for the CSS set for the MBS among first CSS sets configured in the specific slot in the at least one monitoring SS set; and further include second SS sets selected based on each SS set index from among the CSS set for the MBS and USS sets configured in the specific slot in the at least one monitoring SS set until either the first threshold of the UE or the second threshold of the UE is reached.

The various details, functions, procedures, proposals, methods, and/or operational flowcharts described in this document may be applied to a variety of fields that require wireless communication/connections (e.g., 5G) between devices.

Hereinafter, a description will be given in detail with reference to the drawings. In the following drawings/descriptions, the same reference numerals may denote the same or corresponding hardware blocks, software blocks, or functional blocks unless specified otherwise.

Figure 14:
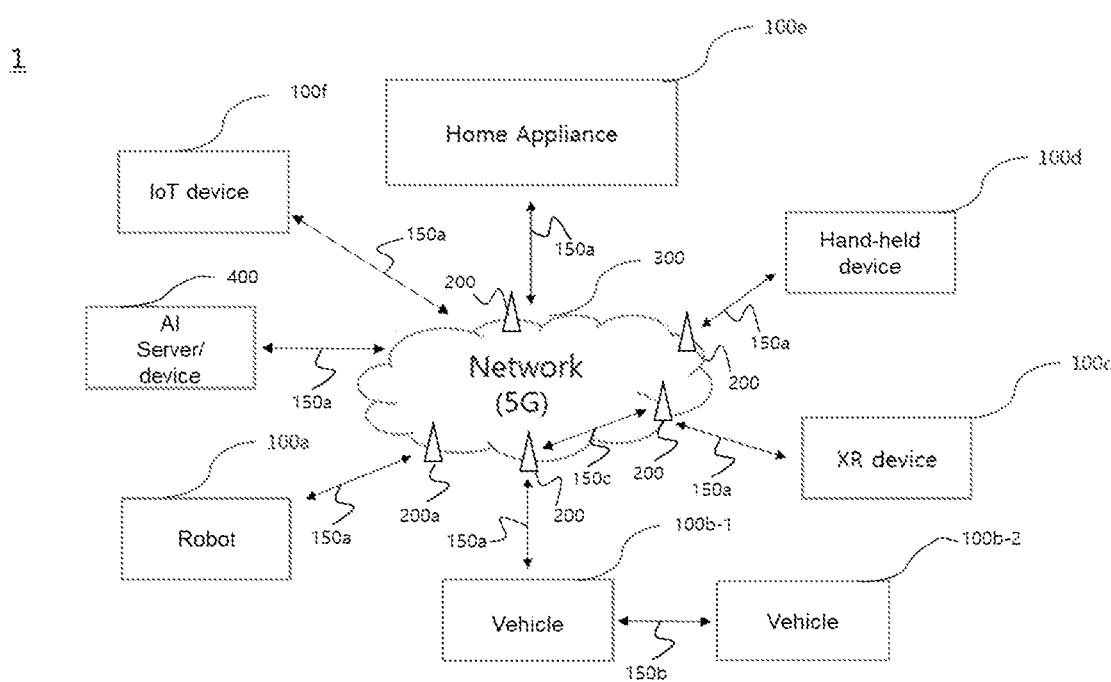
FIGS. 14 to 17 illustrate a communication system 1 and wireless devices applicable to the present disclosure.

FIG. 14 illustrates a communication system 1 applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
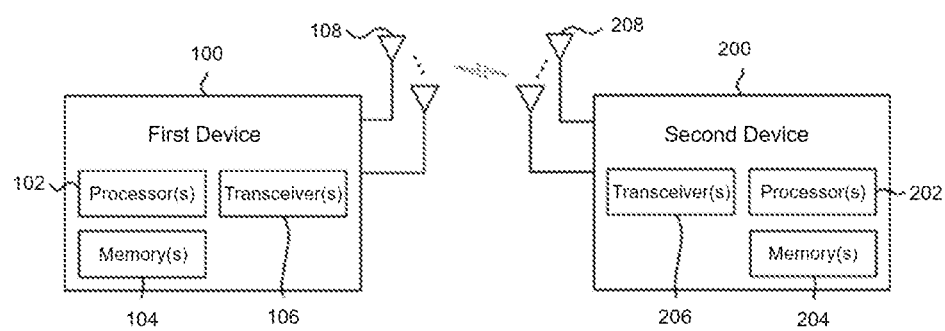

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
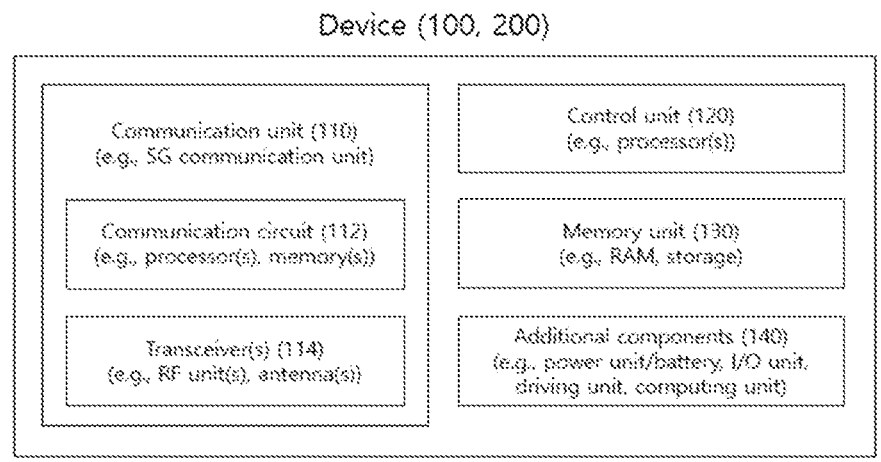

FIG. 16 illustrates another example of a wireless device applied to the present disclosure. The wireless device may be implemented in various forms according to a use-case/service (refer to FIG. 14).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
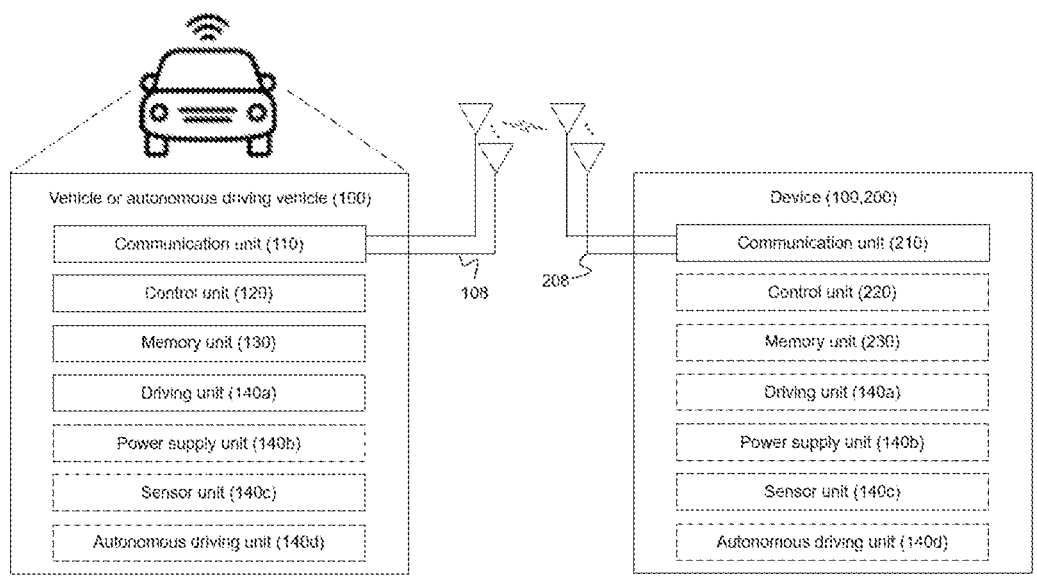

FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 18:
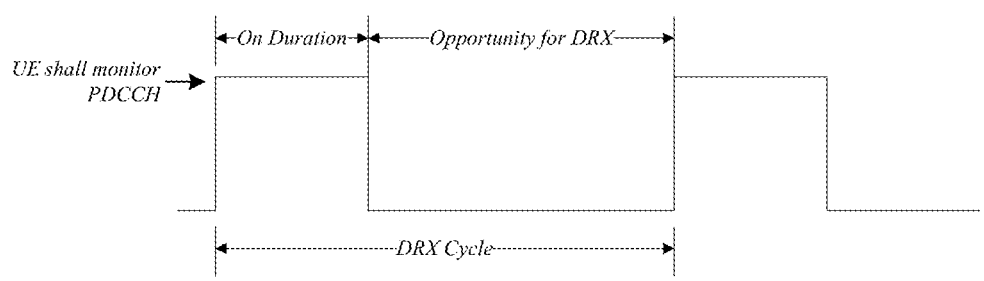
FIG. 18 illustrates discontinuous reception (DRX) operation applicable to the present disclosure.

FIG. 18 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 18, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 12 describes a DRX operation of a UE (in the RRC_CONNECTED state). Referring to Table 12, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 12

|  | Type of signals | UE procedure |
| --- | --- | --- |
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, BSs, or other apparatuses in a wireless mobile communication system.

What is claimed is:

1. A method of receiving, by a user equipment (UE), a physical downlink control channel (PDCCH) including one or more control channel elements (CCEs) in a wireless communication system, the method comprising:

receiving configurations for a plurality of search space (SS) sets including one or more common search space (CSS) sets and one or more UE-specific search space (USS) sets;

determining at least one monitoring SS set to be monitored by the UE in a specific slot configured with two or more of the plurality of SS sets, based on a first threshold related to a PDCCH candidate limit of the UE and a second threshold related to a CCE limit of the UE; and receiving at least one PDCCH signal in the specific slot based on PDCCH candidates included in the determined at least one monitoring SS set, wherein in determining the at least one monitoring SS set, based on that the one or more CSS sets include a CSS set for a multicast broadcast service (MBS) and that the CSS set for the MBS is configured in the specific slot, the UE:

determines, from among first CSS sets configured in the specific slot, to monitor all remaining first CSS sets except for the CSS set for the MBS; and selects, until the UE reaches either the first threshold or the second threshold, second SS sets to be additionally monitored by the UE from among the CSS set for the MBS and USS sets configured in the specific slot, based on each SS set index.

2. The method of claim 1, wherein among the CSS set for the MBS and the USS sets configured in the specific slot, SS sets not selected by the UE are dropped from monitoring of the UE.

3. The method of claim 1, wherein among the CSS set for the MBS and the USS sets configured in the specific slot, an SS set with a lower SS set index has a higher monitoring priority.

4. The method of claim 1, wherein each of the all remaining first CSS sets has a higher monitoring priority than the CSS set for the MBS and the USS sets configured in the specific slot.

5. The method of claim 1, wherein based on that the UE reaches either the first threshold or the second threshold, the CSS set for the MBS is dropped from PDCCH monitoring of the UE, but the all remaining first CSS sets are not dropped.

6. The method of claim 1, wherein based on that an SS set index of the CSS set for the MBS is higher than an SS set index of a first USS and that the UE reaches either the first threshold or the second threshold, the UE selects the first USS and drops the CSS set for the MBS.

7. The method of claim 1, wherein each of the configurations for the plurality of SS sets includes a monitoring periodicity and an SS set index of each SS set.

8. The method of claim 1, wherein the all remaining first CSS sets except for the CSS set for the MBS are related to at least one of CSS Type0 , CSS Type0A, CSS Type1, or CSS Type2 of 3rd generation partnership project (3GPP) based wireless communication.

9. The method of claim 1, wherein based on selection of the CSS set for the MBS, the UE is configured to monitor a UE-group PDCCH in the CSS set for the MBS based on a group radio network temporary identifier (G-RNTI), and wherein a scrambling sequence initialization parameter for the UE-group PDCCH is configured by higher layer signaling or set as a cell identifier.

10. A non-transitory computer-readable storage medium having stored thereon a program for executing the method of claim 1.

11. A user equipment (UE) configured to receive a physical downlink control channel (PDCCH) including one or more control channel elements (CCEs) in a wireless communication system, the UE comprising:

a transceiver; and a processor configured to:

control the transceiver to receive configurations for a plurality of search space (SS) sets including one or more common search space (CSS) sets and one or more UE-specific search space (USS) sets;

determine at least one monitoring SS set to be monitored by the UE in a specific slot configured with two or more of the plurality of SS sets, based on a first threshold related to a PDCCH candidate limit of the UE and a second threshold related to a CCE limit of the UE; and control the transceiver to receive at least one PDCCH signal in the specific slot based on PDCCH candidates included in the determined at least one monitoring SS set, wherein in determining the at least one monitoring SS set, based on that the one or more CSS sets include a CSS set for a multicast broadcast service (MBS) and that the CSS set for the MBS is configured in the specific slot, the processor:

determines, from among first CSS sets configured in the specific slot, to monitor all remaining first CSS sets except for the CSS set for the MBS; and selects, until the UE reaches either the first threshold or the second threshold, second SS sets to be additionally monitored by the UE from among the CSS set for the MBS and USS sets configured in the specific slot, based on each SS set index.

12. A device configured to control a user equipment (UE) configured to receive a physical downlink control channel (PDCCH) including one or more control channel elements (CCEs) in a wireless communication system, the device comprising:

a memory configured to store instructions; and a processor configured to perform operations by executing the instructions, wherein the operations performed by the processor comprise:

receiving configurations for a plurality of search space (SS) sets including one or more common search space (CSS) sets and one or more UE-specific search space (USS) sets;

determining at least one monitoring SS set to be monitored by the UE in a specific slot configured with two or more of the plurality of SS sets, based on a first threshold related to a PDCCH candidate limit of the UE and a second threshold related to a CCE limit of the UE; and receiving at least one PDCCH signal in the specific slot based on PDCCH candidates included in the determined at least one monitoring SS set, wherein in determining the at least one monitoring SS set, based on that the one or more CSS sets include a CSS set for a multicast broadcast service (MBS) and that the CSS set for the MBS is configured in the specific slot, the processor:

determines, from among first CSS sets configured in the specific slot, to monitor all remaining first CSS sets except for the CSS set for the MBS; and selects, until the UE reaches either the first threshold or the second threshold, second SS sets to be additionally monitored by the UE from among the CSS set for the MBS and USS sets configured in the specific slot based on each SS set index.

13. A method of transmitting, by a base station (BS), a physical downlink control channel (PDCCH) including one or more control channel elements (CCEs) in a wireless communication system, the method comprising:

transmitting to a user equipment (UE) configurations for a plurality of search space (SS) sets including one or more common search space (CSS) sets and one or more UE-specific search space (USS) sets;

determining at least one monitoring SS set to be monitored by the UE in a specific slot configured with two or more of the plurality of SS sets, based on a first threshold related to a PDCCH candidate limit of the UE and a second threshold related to a CCE limit of the UE; and transmitting to the UE at least one PDCCH signal in the specific slot based on PDCCH candidates included in the determined at least one monitoring SS set, wherein in determining the at least one monitoring SS set, based on that the one or more CSS sets include a CSS set for a multicast broadcast service (MBS) and that the CSS set for the MBS is configured in the specific slot, the BS:

includes all remaining first CSS sets except for the CSS set for the MBS among first CSS sets configured in the specific slot in the at least one monitoring SS set; and further includes second SS sets selected based on each SS set index from among the CSS set for the MBS and USS sets configured in the specific slot in the at least one monitoring SS set until either the first threshold of the UE or the second threshold of the UE is reached.

14. A base station (BS) configured to transmit a physical downlink control channel (PDCCH) including one or more control channel elements (CCEs) in a wireless communication system, the BS comprising:

a transceiver; and a processor configured to:

control the transceiver to transmit to a user equipment (UE) configurations for a plurality of search space (SS) sets including one or more common search space (CSS) sets and one or more UE-specific search space (USS) sets;

determine at least one monitoring SS set to be monitored by the UE in a specific slot configured with two or more of the plurality of SS sets, based on a first threshold related to a PDCCH candidate limit of the UE and a second threshold related to a CCE limit of the UE; and control the transceiver to transmit to the UE at least one PDCCH signal in the specific slot based on PDCCH candidates included in the determined at least one monitoring SS set, wherein in determining the at least one monitoring SS set, based on that the one or more CSS sets include a CSS set for a multicast broadcast service (MBS) and that the CSS set for the MBS is configured in the specific slot, the processor:

includes all remaining first CSS sets except for the CSS set for the MBS among first CSS sets configured in the specific slot in the at least one monitoring SS set; and further includes second SS sets selected based on each SS set index from among the CSS set for the MBS and USS sets configured in the specific slot in the at least one monitoring SS set until either the first threshold of the UE or the second threshold of the UE is reached.

* * * * *